United States Patent
Ota et al.

(10) Patent No.: US 12,019,457 B2
(45) Date of Patent: Jun. 25, 2024

(54) MOBILITY SERVICE SYSTEM AND MOBILITY SERVICE DELIVERY METHOD

(71) Applicant: TOYOTA JIDOSHA KABUSHIKI KAISHA, Toyota (JP)

(72) Inventors: Shun Ota, Susono (JP); Yoshifumi Otaki, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 322 days.

(21) Appl. No.: 17/508,192

(22) Filed: Oct. 22, 2021

(65) Prior Publication Data

US 2022/0129015 A1    Apr. 28, 2022

(30) Foreign Application Priority Data

Oct. 26, 2020  (JP) ................... 2020-179157

(51) Int. Cl.
| | |
|---|---|
| G05D 1/00 | (2024.01) |
| B60L 58/12 | (2019.01) |
| B64C 29/00 | (2006.01) |
| G06Q 10/02 | (2012.01) |

(52) U.S. Cl.
CPC .............. *G05D 1/102* (2013.01); *B60L 58/12* (2019.02); *B64C 29/00* (2013.01); *G06Q 10/02* (2013.01)

(58) Field of Classification Search
CPC ......... B60L 58/12; B60L 58/14; G05D 1/102; B64C 29/00; G06Q 10/02; Y02T 10/70
See application file for complete search history.

(56) References Cited

U.S. PATENT DOCUMENTS

| | | | |
|---|---|---|---|
| 10,607,461 B2* | 3/2020 | Williams | B64C 39/024 |
| 11,273,911 B2* | 3/2022 | Brand | B64C 39/022 |
| 2017/0032686 A1* | 2/2017 | Alonso Tabares | B64F 1/362 |
| 2017/0268891 A1* | 9/2017 | Dyrnaes | G01C 21/3492 |
| 2018/0350022 A1* | 12/2018 | Stefan | G08G 1/202 |
| 2019/0325757 A1* | 10/2019 | Goel | G05D 1/102 |
| 2020/0026309 A1* | 1/2020 | Ma | B64F 3/00 |
| 2020/0300644 A1* | 9/2020 | Tian | G01C 21/3691 |
| 2021/0046829 A1* | 2/2021 | Gaither | B60L 53/10 |
| 2022/0173934 A1* | 6/2022 | Decenzo | G05D 1/0088 |
| 2022/0180670 A1* | 6/2022 | Sugita | G07C 5/006 |

FOREIGN PATENT DOCUMENTS

| | | | | |
|---|---|---|---|---|
| JP | 2019-214370 A | 12/2019 | | |
| WO | 2015/168320 A1 | 11/2015 | | |
| WO | WO-2016059213 A1 * | 4/2016 | ........... | B64C 39/024 |
| WO | WO-2019089677 A1 * | 5/2019 | ............ | B64C 29/00 |

* cited by examiner

*Primary Examiner* — Babar Sarwar
(74) *Attorney, Agent, or Firm* — Dinsmore & Shohl LLP

(57) ABSTRACT

A mobility service system plans an itinerary including movement from a first takeoff and landing site to a second takeoff and landing site in response to a reservation request from a user. Specifically, the mobility service system identifies a first eVTOL available at the first takeoff and landing site, and estimates a first amount of battery charge of the first eVTOL at a time of start of use by the user. When a first flight from the first takeoff and landing site to the second takeoff and landing site is not achievable with the first amount of battery charge, the mobility service system searches for a second flight from the first takeoff and landing site to a third takeoff and landing site that is achievable with the first amount of battery charge, and plans a second itinerary that goes through the third takeoff and landing site.

10 Claims, 26 Drawing Sheets

| MOBILITY MODES BEFORE DEALER | MOBILITY MODES BETWEEN DEALERS | MOBILITY MODES AFTER DEALER |
|---|---|---|
| OWN RIDE-SHARING | AIR TAXI | OWN RIDE-SHARING |
| RIDE-SHARING PROVIDED BY ANOTHER COMPANY | AIR TAXI | RIDE-SHARING PROVIDED BY ANOTHER COMPANY |
| USER'S PRIVATE VEHICLE | AIR TAXI | TAXI |
| TAXI | AIR TAXI | USER'S PRIVATE VEHICLE |
| PUBLIC TRANSPORTATION | AIR TAXI | OWN RIDE-SHARING |

FIG. 2

|  | HELIPORT | HELICOPTER EVACUATION SPACE | BATTERY CHARGING FACILITY | | PARKING LOT | LATITUDE LONGITUDE |
| --- | --- | --- | --- | --- | --- | --- |
|  |  |  | eVTOL | EV PHV |  |  |
| DEALER-1 | YES | YES | YES | YES | YES |  |
| DEALER-2 | YES | YES | YES | YES | YES |  |
| PARTNER HELIPORT | YES | NO | NO | NO | NO |  |
| eVTOL HANGAR | YES | YES | YES | NO | NO |  |
| CAR RENTAL OFFICE-A | NO | NO | NO | YES | YES |  |

FIG. 12

MOBILITY SERVICE SYSTEM AND MOBILITY SERVICE DELIVERY METHOD

CROSS-REFERENCE TO RELATED APPLICATION

This application claims priority to Japanese Patent Application No. 2020-179157 filed on Oct. 26, 2020, the entire contents of which are herein incorporated by reference.

BACKGROUND

Technical Field

The present disclosure relates to a technique of delivering a mobility service utilizing an electric vertical takeoff and landing aircraft (eVTOL).

Background Art

Japanese Laid-Open Patent Application Publication No. JP-2019-214370 discloses an electric multi-rotor aircraft. For example, the electric multi-rotor aircraft is an electric vertical takeoff and landing aircraft.

SUMMARY

In recent years, a concept of MaaS (Mobility as a Service) has been proposed, and a mobility service utilizing a variety of mobility modes (transportation) in an integrated manner has been proposed. It is conceivable to utilize, as the mobility modes, not only a ground mobility modes such as an automobile and a train but also an air mobility modes. In particular, it is conceivable to utilize an eVTOL as the air mobility modes.

A situation where a user makes a reservation of the mobility service including a flight utilizing the eVTOL is considered. There may be a case where the eVTOL available at a time of use desired by the user is limited. Moreover, an amount of battery charge of the available eVTOL is not always sufficient for carrying out the flight. Rejecting the reservation just because the amount of battery charge of the available eVTOL is insufficient leads to decrease in service delivery opportunity.

An object of the present disclosure is to provide a technique capable of increasing opportunities for the mobility service utilizing the eVTOL.

A first aspect is directed to a mobility service system that delivers a mobility service utilizing an electric vertical takeoff and landing aircraft (eVTOL).

The mobility service system includes one or more processors configured to execute a reservation process that plans an itinerary including movement from a first takeoff and landing site to a second takeoff and landing site in response to a reservation request from a user.

In the reservation process, the one or more processors are further configured to:
  identify a first eVTOL that is available at the first takeoff and landing site;
  estimate a first amount of battery charge of the first eVTOL at a time of start of use by the user;
  determine whether or not a first flight from the first takeoff and landing site to the second takeoff and landing site is achievable with the first amount of battery charge;
  when the first flight is achievable with the first amount of battery charge, plan a first itinerary including the first flight; and
  when the first flight is not achievable with the first amount of battery charge, search for a second flight from the first takeoff and landing site to a third takeoff and landing site that is achievable with the first amount of battery charge, and plan a second itinerary that goes through the third takeoff and landing site.

The second itinerary includes a combination of the second flight from the first takeoff and landing site to the third takeoff and landing site by the first eVTOL and movement from the third takeoff and landing site to the second takeoff and landing site by a transportation different from the first eVTOL.

A second aspect is directed to a mobility service delivery method that delivers a mobility service utilizing an electric vertical takeoff and landing aircraft (eVTOL).

The mobility service delivery method is performed by a computer executing a computer program.

The mobility service delivery method includes a reservation process that plans an itinerary including movement from a first takeoff and landing site to a second takeoff and landing site in response to a reservation request from a user.

The reservation process includes:
  identifying a first eVTOL that is available at the first takeoff and landing site;
  estimating a first amount of battery charge of the first eVTOL at a time of start of use by the user;
  determining whether or not a first flight from the first takeoff and landing site to the second takeoff and landing site is achievable with the first amount of battery charge;
  when the first flight is achievable with the first amount of battery charge, planning a first itinerary including the first flight; and
  when the first flight is not achievable with the first amount of battery charge, searching for a second flight from the first takeoff and landing site to a third takeoff and landing site that is achievable with the first amount of battery charge, and planning a second itinerary that goes through the third takeoff and landing site.

The second itinerary includes a combination of the second flight from the first takeoff and landing site to the third takeoff and landing site by the first eVTOL and movement from the third takeoff and landing site to the second takeoff and landing site by a transportation different from the first eVTOL.

According to the present disclosure, when the first flight from the first takeoff and landing site to the second takeoff and landing site is not achievable with the first amount of battery charge, the second itinerary going through the third takeoff and landing site is planned. As a result, a probability of being able to accept the reservation requested by the user increases. Therefore, opportunities for the mobility service utilizing the eVTOL increase. This contributes to further increase in convenience of the mobility service.

BRIEF DESCRIPTION OF DRAWINGS

FIG. 2 shows a variety of examples of combinations of mobility modes utilizing an eVTOL;

FIG. 12 is a conceptual diagram showing an example of takeoff and landing site information;

EMBODIMENTS

Embodiments of the present disclosure will be described with reference to the accompanying drawings.

1. Mobility Service

Figure 1:
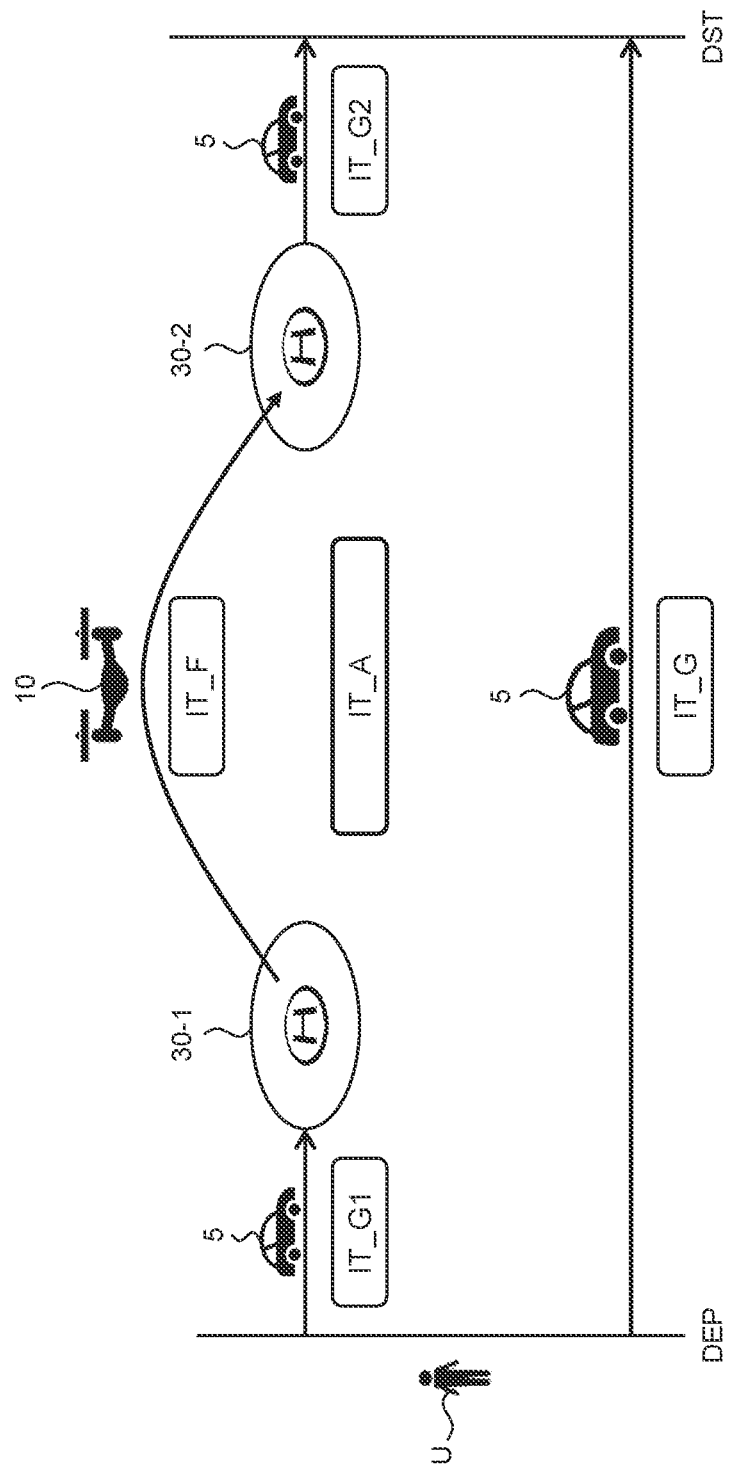
FIG. 1 is a conceptual diagram for explaining an outline of a mobility service.

FIG. 1 is a conceptual diagram for explaining an outline of a mobility service according to the present embodiment. The mobility service utilizes a variety of mobility modes (transportation) in an integrated manner. A general mobility service utilizes a ground mobility modes 5 such as an automobile, a train, and the like. Examples of the automobile include a taxi, a bus, a ride-sharing vehicle, a MaaS vehicle, and the like.

According to the present embodiment, not only the ground mobility modes 5 but also an air mobility modes is used for the mobility service. In particular, an electric vertical takeoff and landing aircraft (eVTOL) 10 is used as the air mobility modes. Hereinafter, eVTOL means an electric vertical takeoff and landing aircraft. The eVTOL 10 is a compact and lightweight VTOL driven by an electric motor. Such the eVTOL 10 is characterized by space-saving, lower costs, and lower noise as compared with a usual aircraft. For example, the eVTOL 10 is useful for an air taxi business where movement for a relatively short distance is repeated at a high frequency.

A takeoff and landing site 30 is a place for the eVTOL 10 to take off or land. Examples of the takeoff and landing site 30 include an airport, an airdrome, a heliport, a roof of a building, an eVTOL hangar, and the like.

As a still another example, the takeoff and landing site 30 may be an auto dealer. In that case, a space for the eVTOL 10 to take off and land is provided in the grounds of the dealer. Utilizing the dealer as the takeoff and landing site 30 makes it possible to seamlessly connect the ground mobility service utilizing the automobile and the air mobility service utilizing the eVTOL 10. In addition, it enables an one-stop service providing the both mobility services. Furthermore, utilizing a dealer network makes it possible to construct a mobility service network. Similarly, the takeoff and landing site 30 may be a car rental office.

A case where a user U uses the mobility service for moving from a point of departure DEP to a destination DST as shown in FIG. 1 is considered. One option is to move from the point of departure DEP to the destination DST by using the ground mobility modes 5 such as an automobile. An itinerary using only the ground mobility modes 5 is hereinafter referred to as an "itinerary IT_G." Another option is to move from the point of departure DEP to the destination DST by using the eVTOL 10 as well. An itinerary using the eVTOL 10 is hereinafter referred to as an "itinerary IT_A."

An example of the itinerary IT_A is as follows. A first takeoff and landing site 30-1 is a takeoff and landing site 30 on a side of the point of departure DEP, and a second takeoff and landing site 30-2 is a takeoff and landing site 30 on a side of the destination DST. For example, the first takeoff and landing site 30-1 is a takeoff and landing site 30 nearest to the point of departure DEP, and the second takeoff and landing site 30-2 is a takeoff and landing site 30 nearest to the destination DST. The user U moves from the point of departure DEP to the first takeoff and landing site 30-1 by using the ground mobility modes 5 (itinerary IT_G1). Subsequently, the user U moves from the first takeoff and landing site 30-1 to the second takeoff and landing site 30-2 by using the eVTOL 10 (itinerary IT_F). Then, the user U moves from the second takeoff and landing site 30-2 to the destination DST by using the ground mobility modes 5 (itinerary IT_G2). The itinerary IT_A is a combination of the three itineraries IT_G1, IT_F, and IT_G2.

The user U can select a one from the itinerary IT_G and the itinerary IT_A. For example, the user U selects an itinerary in consideration of a required time and a usage fee. As described above, the mobility service utilizing not only the ground mobility modes 5 but also the eVTOL 10 is able to offer the user U a variety of options, which is preferable.

FIG. 2 shows a variety of examples of combinations of mobility modes utilizing the eVTOL 10. In the example shown in FIG. 2, the takeoff and landing site 30 is a dealer. The mobility modes between dealers (i.e., the first takeoff and landing site 30-1 and the second takeoff and landing site 30-2) is, for example, an air taxi utilizing the eVTOL 10. Examples of the mobility modes before and after the dealers include ride-sharing, a private vehicle of the user U, a taxi, a public transportation, and the like. In this manner, a variety of combinations of the mobility modes are possible.

Hereinafter, a "mobility service system" that delivers the mobility service according to the present embodiment will be described in detail.

2. Mobility Service System

Figure 3:
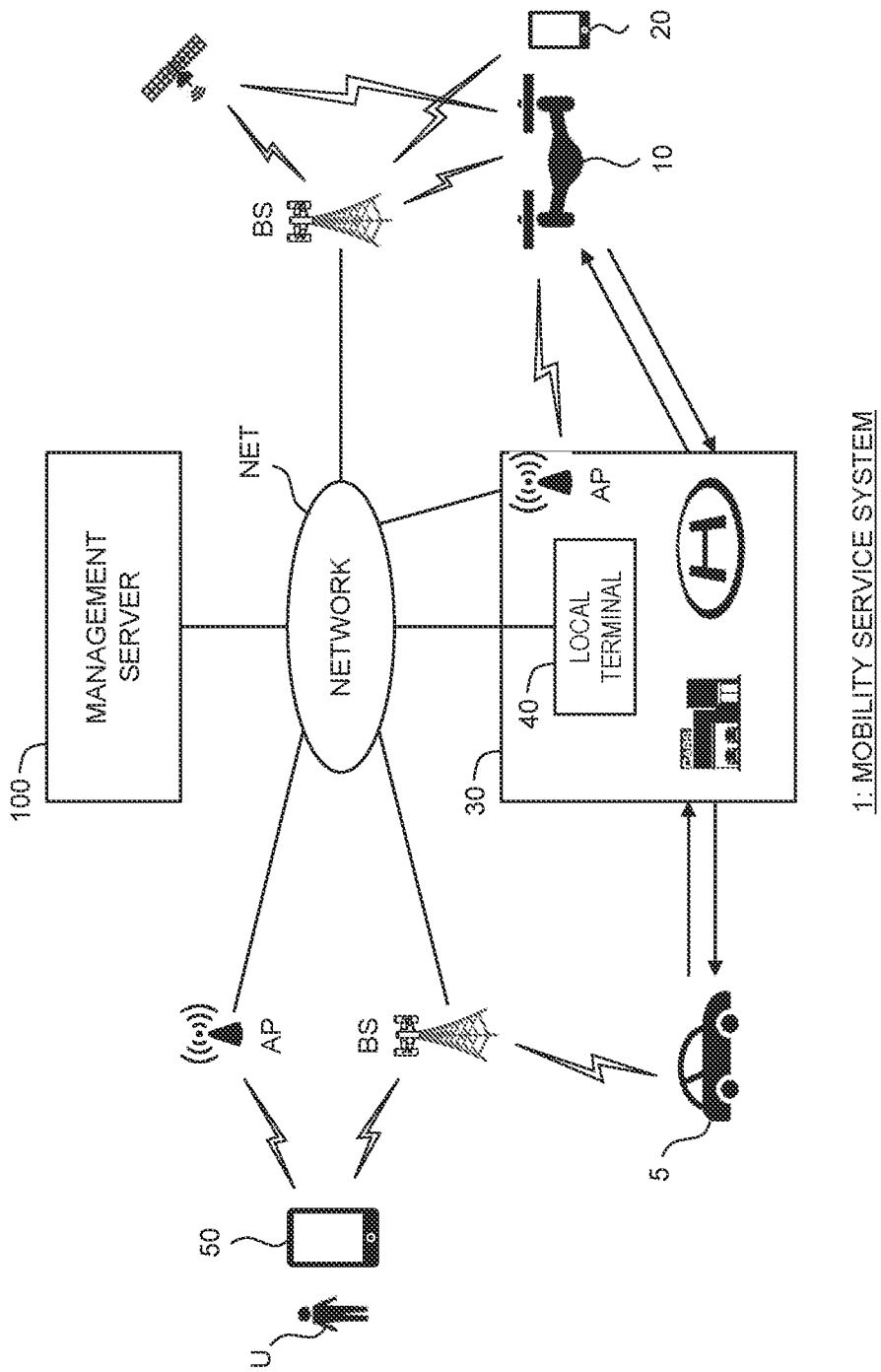
FIG. 3 is a schematic diagram showing a configuration of a mobility service system.

FIG. 3 is a schematic diagram showing a configuration of a mobility service system 1 according to the present embodiment. The mobility service system 1 includes the ground mobility modes 5, the eVTOL 10, a pilot terminal 20, the takeoff and landing site 30, a local terminal 40, a user terminal 50 of the user U, a management server 100 (central server), and a communication network NET. The number of eVTOLs 10 and the number of takeoff and landing sites 30 are arbitrary. For instance, a large number of eVTOLs 10 and a larger number of takeoff and landing sites 30 are utilized.

Each mobility modes and each device can be connected to the communication network NET and can communicate via the communication network NET. For example, the ground mobility modes 5 can be connected to the communication network NET via a wireless base station BS. The eVTOL 10 and the pilot terminal 20 each can be connected to the communication network NET via a wireless base station BS. The eVTOL 10 and the pilot terminal 20 each can be connected to the communication network NET via an access point AP of a wireless LAN (Local Area Network) installed in the takeoff and landing site 30. The eVTOL 10 may perform communication using satellite communication or a dedicated line. The local terminal 40 can be connected to the communication network NET by wire or via an access point AP of a wireless LAN. The user terminal 50 can be connected to the communication network NET via a wireless base station BS or an access point AP of a wireless LAN. The management server 100 can be connected to the communication network NET by wire or via an access point AP of a wireless LAN.

Hereinafter, each component of the mobility service system 1 according to the present embodiment will be described in more detail.

2-1. eVTOL 10

Figure 4:
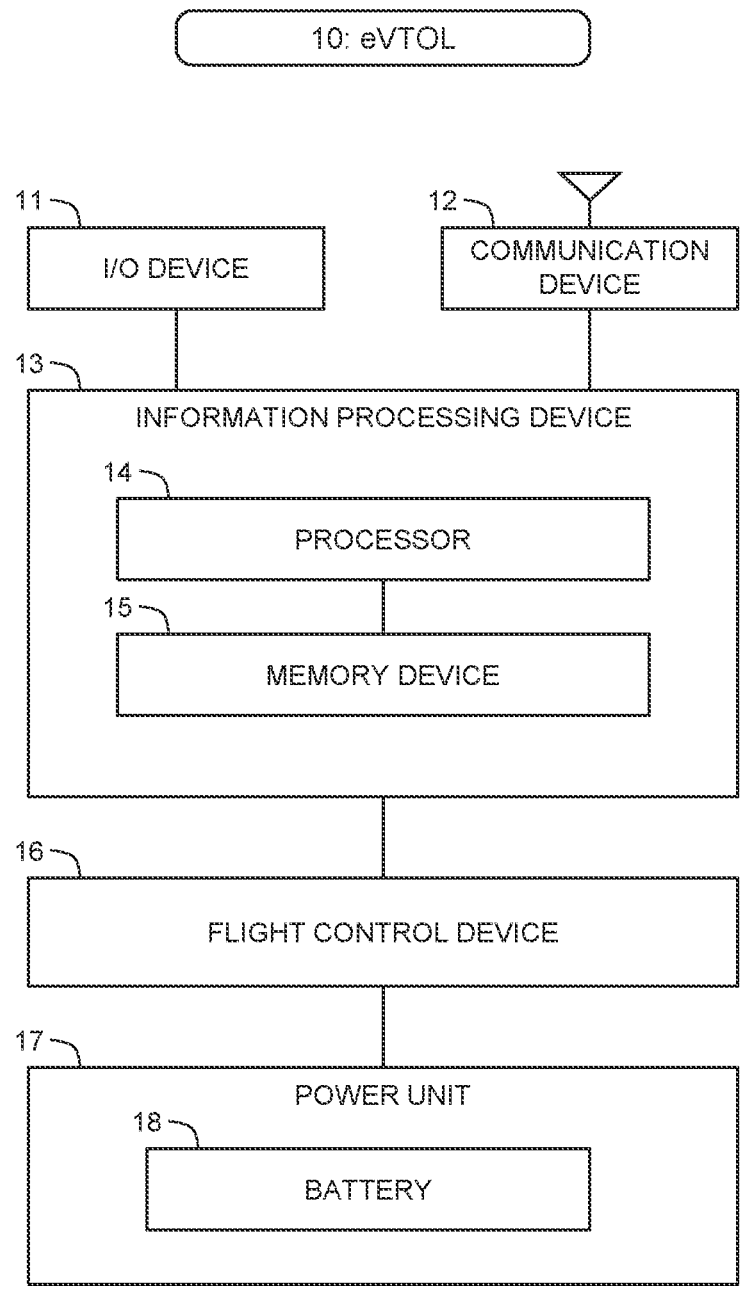
FIG. 4 is a block diagram showing a configuration example of an eVTOL.

FIG. 4 is a block diagram showing a configuration example of the eVTOL 10 according to the present embodiment. The eVTOL 10 includes an input/output device 11, a communication device 12, an information processing device 13, a flight control device 16, and a power unit 17.

The input/output device 11 is an interface for receiving information from a pilot of the eVTOL 10 and for providing information to the pilot. Examples of the input device include a keyboard, a mouse, a touch panel, a switch, a microphone, and the like. Examples of the output device include a display device, a speaker, and the like.

The communication device 12 performs communication with the outside. For example, the communication device 12 performs wireless communication with the wireless base station BS and the access point AP. As another example, the communication device 12 may perform near field communication with the user terminal 50. As yet another example, during a flight of the eVTOL 10, the communication device 12 may perform communication using satellite communication or a dedicated line.

The information processing device 13 executes a variety of information processing. For example, the information processing device 13 includes one or more processors 14 and one or more memory devices 15. The processor 14 executes a variety of information processing. For example, the processor 14 includes a CPU (Central Processing Unit). The memory device 15 stores a variety of information necessary for the processing by the processor 14. Examples of the memory device 15 include a volatile memory, a non-volatile memory, an HDD (Hard Disk Drive), an SSD (Solid State Drive), and the like. Functions of the information processing device 13 are achieved by the processor 14 executing a computer program. The computer program is stored in the memory device 15. The computer program may be recorded on a computer-readable recording medium. The computer program may be provided via a network.

The flight control device 16 controls the flight of the eVTOL 10 by controlling the power unit 17.

The power unit 17 includes an electric motor for rotating a rotor of the eVTOL 10, a battery 18 for supplying electric power to the electric motor, and the like. For example, the battery 18 is a storage battery such as an all-solid-state battery and the like. Alternatively, the battery 18 may be a fuel cell. In the following description, "charging the battery 18" means "charging the storage battery". When the eVTOL 10 is equipped with the fuel cell, "charging the battery 18" is realized by "supplying hydrogen to the fuel cell."

2-2. Pilot Terminal 20

Figure 5:
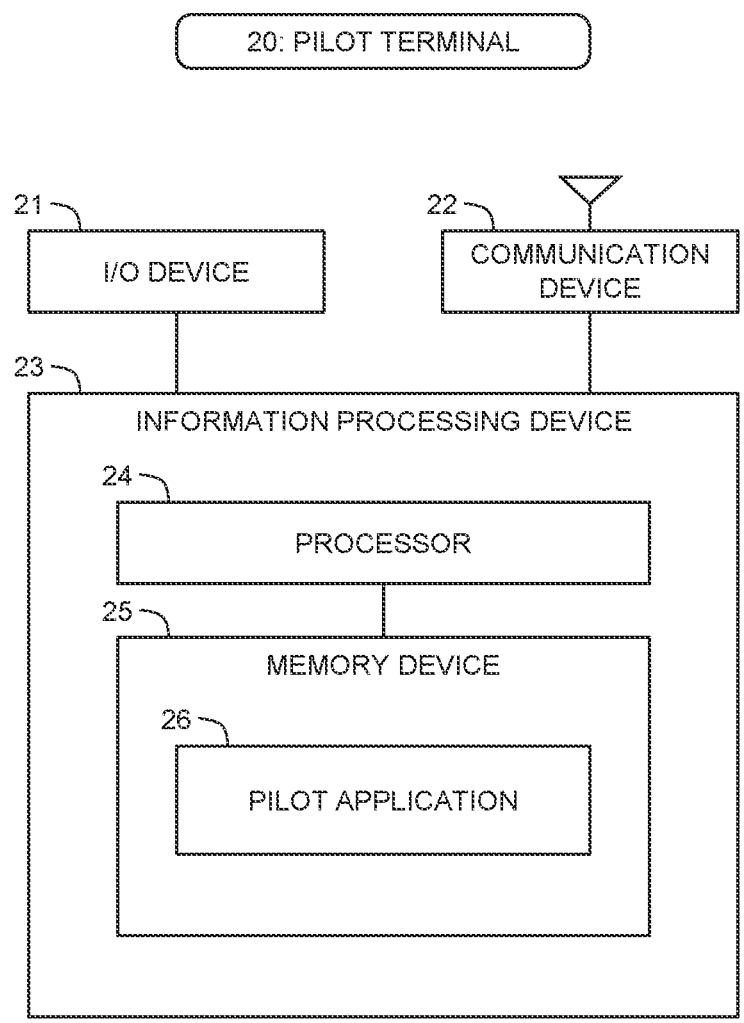
FIG. 5 is a block diagram showing a configuration example of a pilot terminal.

FIG. 5 is a block diagram showing a configuration example of the pilot terminal 20 according to the present embodiment. The pilot terminal 20 is a terminal used by the pilot of the eVTOL 10. For example, the pilot terminal 20 is a smartphone. The pilot terminal 20 includes an input/output device 21, a communication device 22, and an information processing device 23.

The input/output device 21 is an interface for receiving information from the pilot of the eVTOL 10 and for providing information to the pilot. Examples of the input device include a touch panel, a camera, a microphone, and the like. Examples of the output device include a display device, a speaker, and the like.

The communication device 22 performs communication with the outside. For example, the communication device 22 performs wireless communication with the wireless base station BS and the access point AP. As another example, the communication device 22 may perform near field communication with the user terminal 50.

The information processing device 23 executes a variety of information processing. For example, the information processing device 23 includes one or more processors 24 and one or more memory devices 25. The processor 24 executes a variety of information processing. For example, the processor 24 includes a CPU. The memory device 25 stores a variety of information necessary for the processing by the processor 24. Examples of the memory device 25 include a volatile memory, a non-volatile memory, and the like. Functions of the information processing device 23 are achieved by the processor 24 executing a computer program. The computer program is stored in the memory device 25. The computer program may be recorded on a computer-readable recording medium. The computer program may be provided via a network.

The computer program includes a pilot application 26. The pilot application 26 provides the pilot with functions necessary for delivering the mobility service. The functions necessary for delivering the mobility service are achieved by the processor 24 executing the pilot application 26.

2-3. Takeoff and Landing Site 30

Figure 6:
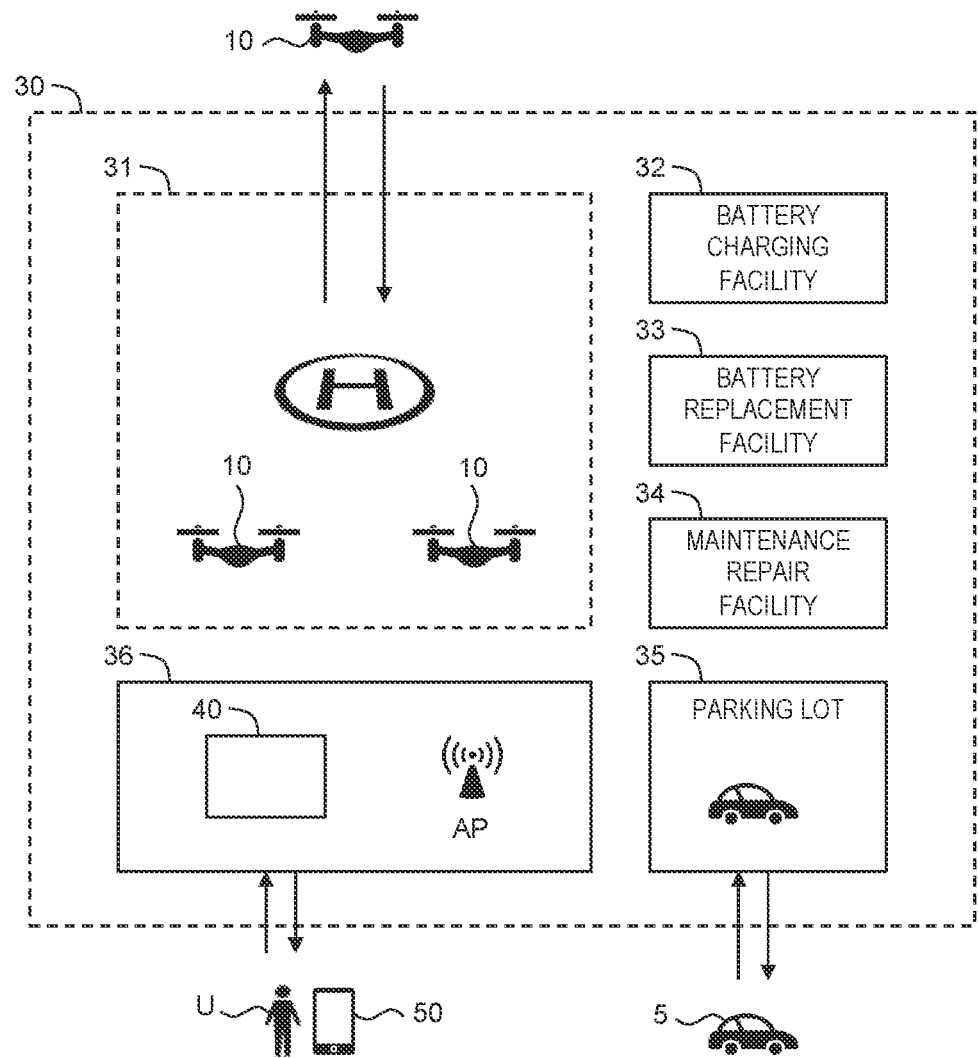
FIG. 6 is a block diagram showing a configuration example of a takeoff and landing site.

FIG. 6 is a block diagram showing a configuration example of the takeoff and landing site 30 according to the present embodiment. The takeoff and landing site 30 includes at least a takeoff and landing space 31. The takeoff and landing space 31 is a space for the eVTOL 10 to take off and land.

The takeoff and landing site 30 may include at least one of a battery charging facility 32, a battery replacement facility 33, and a maintenance/repair facility 34. The battery charging facility 32 is a facility for charging the battery 18 of the eVTOL 10. The battery replacement facility 33 is a facility for replacing the battery 18 of the eVTOL 10. The maintenance/repair facility 34 is a facility for performing maintenance and repair of the eVTOL 10.

The takeoff and landing site 30 may include a parking lot 35 for parking automobiles. The user U can access the takeoff and landing site 30 by using an automobile. The takeoff and landing site 30 may also offer a mobility service utilizing an automobile. The takeoff and landing site 30 may be an auto dealer, a car rental office, or the like.

The takeoff and landing site 30 may include a management facility 36. The management facility 36 is a facility for managing the mobility service delivered to the user U at the takeoff and landing site 30. For example, the user U checks in the eVTOL 10 at the management facility 36. As another example, at the management facility 36, the user U performs a procedure for using the ground mobility modes 5 such as the automobile. The management facility 36 may be provided with the local terminal 40, the access point AP of the wireless LAN, and the like. The local terminal 40 is a management terminal for managing the mobility service delivered to the user U at the management facility 36.

2-4. Local Terminal 40

Figure 7:
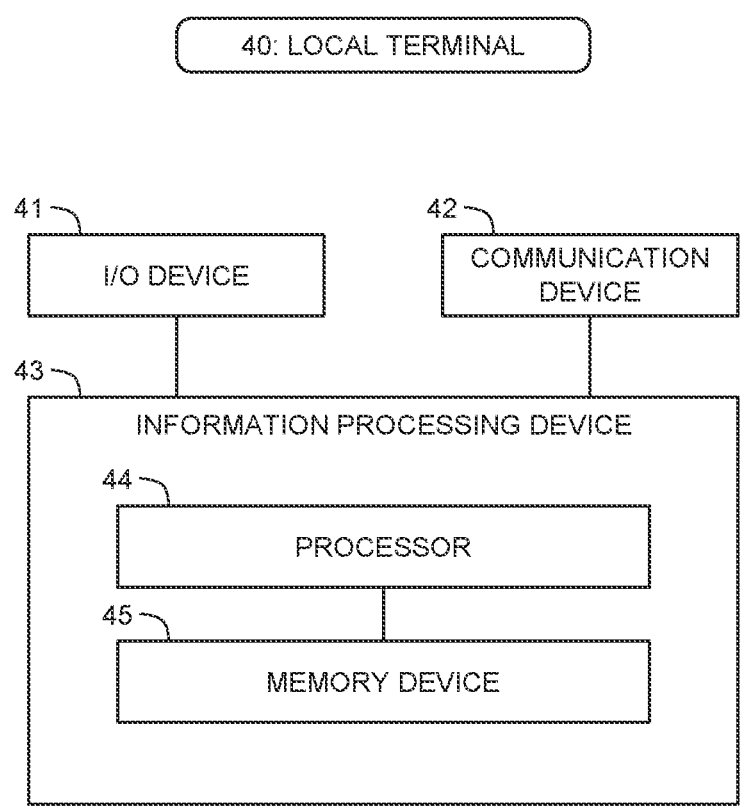
FIG. 7 is a block diagram showing a configuration example of a local terminal.

FIG. 7 is a block diagram showing a configuration example of the local terminal 40 according to the present embodiment. The local terminal 40 is a management terminal installed in the takeoff and landing site 30. The local terminal 40 includes an input/output device 41, a communication device 42, and an information processing device 43.

The input/output device 41 is an interface for receiving information from an operator of the local terminal 40 and providing information to the operator. Examples of the input device include a keyboard, a mouse, a touch panel, a switch, a microphone, and the like. Examples of the output device include a display device, a speaker, and the like.

The communication device 42 performs communication with the outside. For example, the communication device 42 performs wire communication. As another example, the communication device 42 may perform near field communication with the user terminal 50.

The information processing device 43 executes a variety of information processing. For example, the information processing device 43 includes one or more processors 44 and one or more memory devices 45. The processor 44 executes a variety of information processing. For example, the processor 44 includes a CPU. The memory device 45 stores a variety of information necessary for the processing by the processor 44. Examples of the memory device 45 include a volatile memory, a non-volatile memory, an HDD, an SSD, and the like. Functions of the information processing device 43 are achieved by the processor 44 executing a computer program. The computer program is stored in the memory device 45. The computer program may be recorded on a computer-readable recording medium. The computer program may be provided via a network.

2-5. User Terminal 50

Figure 8:
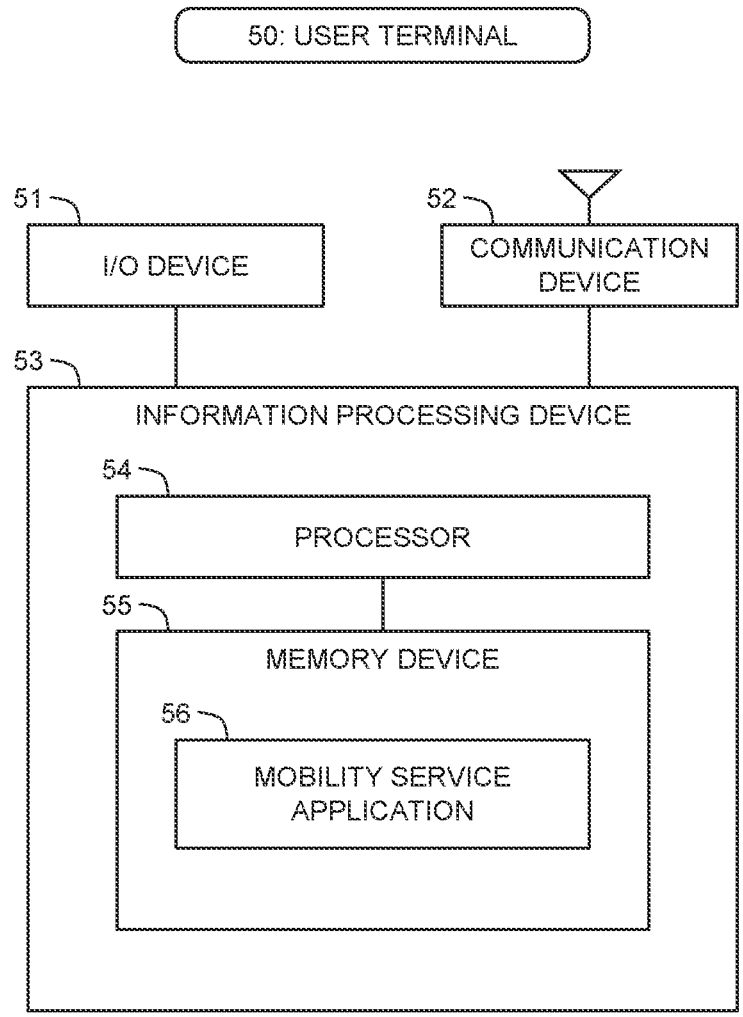
FIG. 8 is a block diagram showing a configuration example of a user terminal.

FIG. 8 is a block diagram showing a configuration example of the user terminal 50 according to the present embodiment. The user terminal 50 is a terminal used by the user U. For example, the user terminal 50 is a smartphone. The user terminal 50 includes an input/output device 51, a communication device 52, and an information processing device 53.

The input/output device 51 is an interface for receiving information from the user U and for providing information to the user U. Examples of the input device include a touch panel, a camera, a microphone, and the like. Examples of the output device include a display device, a speaker, and the like.

The communication device 52 performs communication with the outside. For example, the communication device 52 performs wireless communication with the wireless base station BS and the access point AP. As another example, the communication device 52 may perform near field communication with the pilot terminal 20 and the local terminal 40.

The information processing device 53 executes a variety of information processing. For example, the information processing device 53 includes one or more processors 54 and one or more memory devices 55. The processor 54 executes a variety of information processing. For example, the processor 54 includes a CPU. The memory device 55 stores a variety of information necessary for the processing by the processor 54. Examples of the memory device 55 include a volatile memory, a non-volatile memory, and the like. Functions of the information processing device 53 are achieved by the processor 54 executing a computer program. The computer program is stored in the memory device 55. The computer program may be recorded on a computer-readable recording medium. The computer program may be provided via a network.

The computer program includes a mobility service application 56. The mobility service application 56 provides the user U with functions necessary for utilizing the mobility service. The functions necessary for utilizing the mobility service are achieved by the processor 54 executing the mobility service application 56.

2-6. Management Server 100

Figure 9:
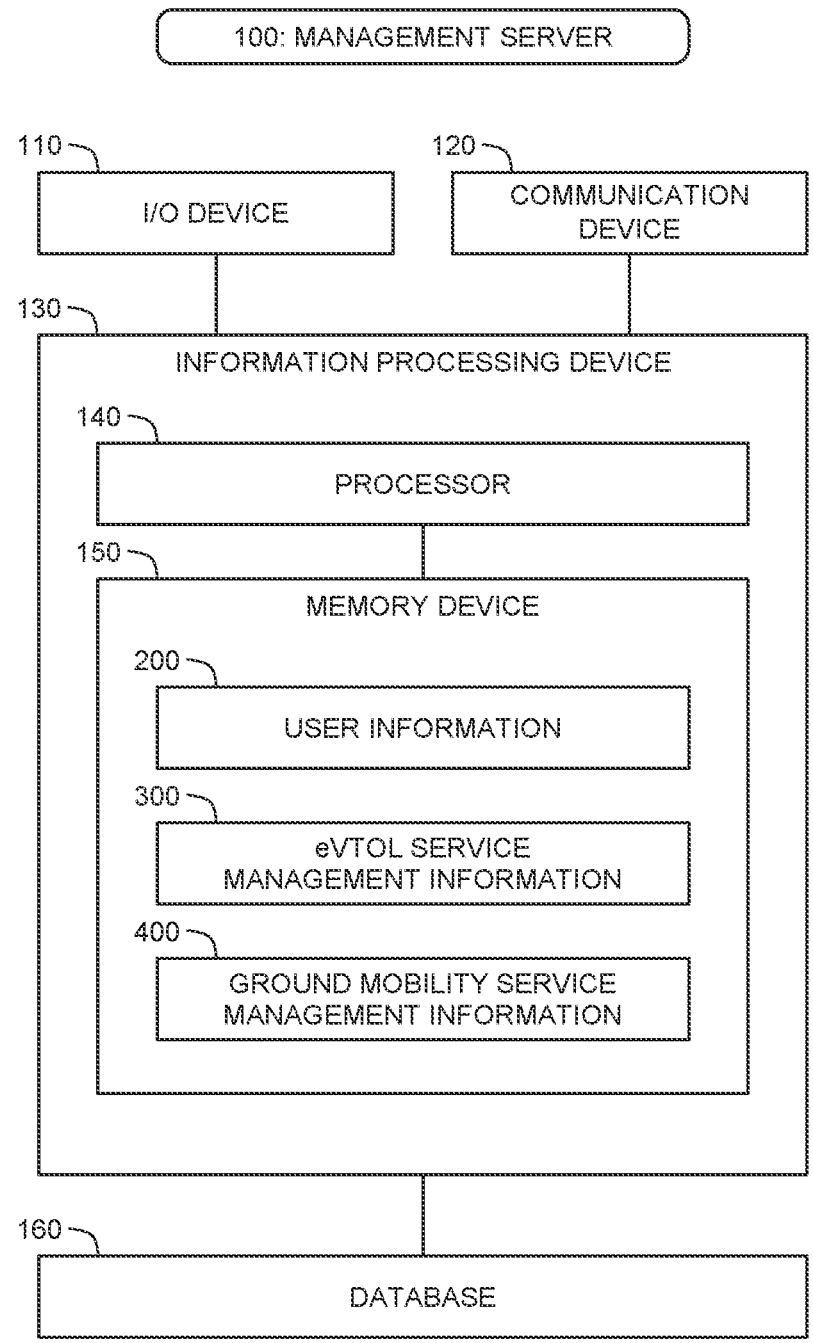
FIG. 9 is a block diagram showing a configuration example of a management server.

FIG. 9 is a block diagram showing a configuration example of the management server 100 according to the present embodiment. The management server 100 manages the entire mobility service and delivers the mobility service to the user U. The management server 100 may be a distributed server. The management server 100 includes an input/output device 110, a communication device 120, and an information processing device 130.

The input/output device 110 is an interface for receiving information from an operator of the management server 100 and providing information to the operator. Examples of the input device include a keyboard, a mouse, a touch panel, a switch, a microphone, and the like. Examples of the output device include a display device, a speaker, and the like.

The communication device 120 performs communication with the outside. For example, the communication device 120 performs wire communication.

The information processing device 130 executes a variety of information processing. For example, the information processing device 130 includes one or more processors 140 and one or more memory devices 150. The processor 140 executes a variety of information processing. For example, the processor 140 includes a CPU. The memory device 150 stores a variety of information necessary for the processing by the processor 140. Examples of the memory device 150 include a volatile memory, a non-volatile memory, an HDD, an SSD, and the like. Functions of the information processing device 130 are achieved by the processor 140 executing a computer program. The computer program is stored in the memory device 150. The computer program may be recorded on a computer-readable recording medium. The computer program may be provided via a network.

Moreover, the information processing device 130 is accessible to a database 160. The database 160 is realized by a predetermined memory device. The database 160 may be included in the memory device 150 of the management server 100. Alternatively, the database 160 may exist outside the management server 100. The database 160 stores a variety of information necessary for delivering the mobility service. The information processing device 130 reads necessary information from the database 160 and stores it in the memory device 150.

The information necessary for delivering the mobility service includes user information 200, eVTOL service management information 300, and ground mobility service management information 400. The information processing device 130 executes an "information acquisition process" that acquires the user information 200, the eVTOL service management information 300, and the ground mobility service management information 400.

Figure 10:
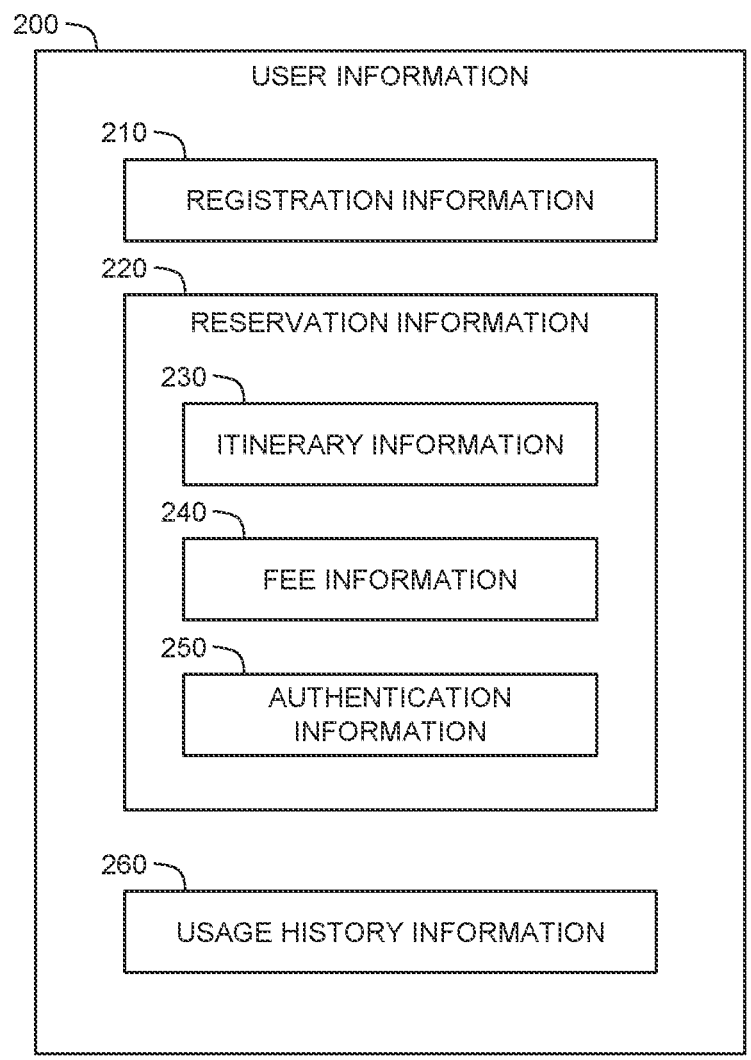
FIG. 10 is a block diagram showing an example of user information.

FIG. 10 is a block diagram showing an example of the user information 200. The user information 200 is information related to the user U. For example, the user information 200 includes registration information 210, reservation information 220, and usage history information 260.

The registration information 210 includes an ID and a name of the user U. The registration information 210 is registered in advance by the user U. For example, the user U operates the user terminal 50 to input the registration information 210. The user terminal 50 transmits the registration information 210 to the management server 100. The information processing device 130 receives the registration information 210 via the communication device 120, and records the registration information 210 in the database 160.

The reservation information 220 is information about the mobility service reserved by the user U. The information processing device 130 generates the reservation information 220 in response to a reservation request from the user U. Details of the reservation process will be described later.

The reservation information 220 includes at least itinerary information 230. The itinerary information 230 indicates the itinerary of the mobility service used by user U. For example, the itinerary information 230 includes a point of departure DEP, a destination DST, a route, mobility modes to be used, takeoff and landing sites 30 to be used, a time of departure, a time of arrival, a required time from the point of departure DEP to the destination DST, and the like.

The reservation information 220 may include fee information 240. The fee information 240 indicates a usage fee of the mobility service used by the user U.

The reservation information 220 may include authentication information 250. The authentication information 250 is information used for authenticating the user U when the user U boards the reserved mobility modes. The authentication information 250 includes an authentication code. The authentication information 250 may be a QR code (registered trademark).

The usage history information 260 indicates a history of the mobility service used by the user U.

Figure 11:
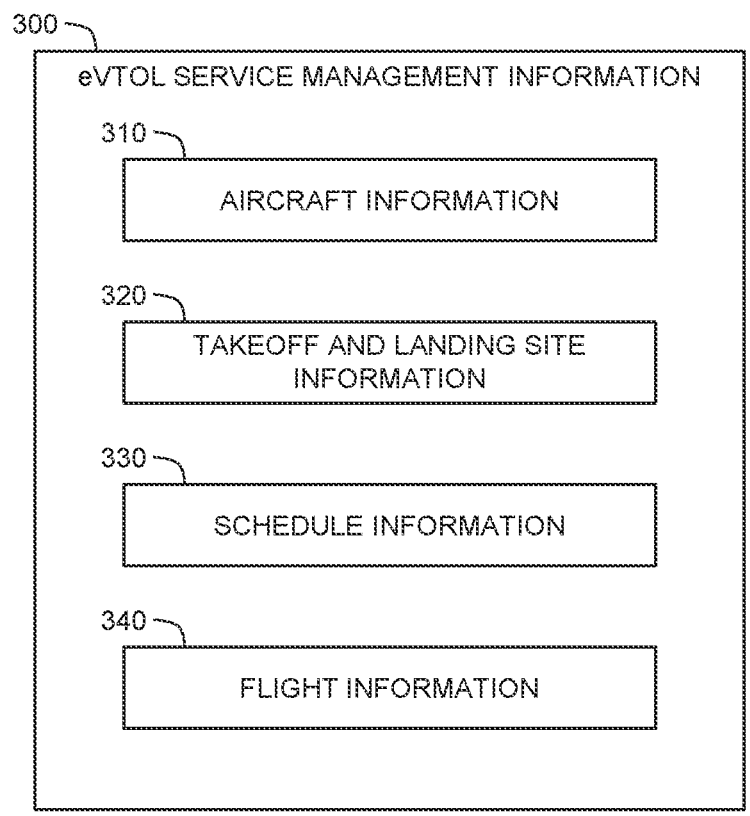
FIG. 11 is a block diagram showing an example of eVTOL service management information.

FIG. 11 is a block diagram showing an example of the eVTOL service management information 300. The eVTOL service management information 300 is information for managing the mobility service that utilizes the eVTOL 10. For example, the eVTOL service management information 300 includes aircraft information 310, takeoff and landing site information 320, schedule information 330, and flight information 340.

The aircraft information 310 is information on each of one or more eVTOLs 10 used for the mobility service. More specifically, the aircraft information 310 includes an aircraft ID, performance information, and the like of each eVTOL 10. The performance information includes a flight range, a maximum flight speed, and the like. The flight range is the maximum distance for which the eVTOL 10 is able to fly without being charged halfway. In addition, the performance information includes "battery performance information" regarding performance of the battery 18 of the eVTOL 10. The battery performance information includes a maximum battery capacity, a remaining battery level, a charging time required to charge the battery 18 to full capacity, and the like. Furthermore, the battery performance information indicates whether the eVTOL 10 is an aircraft whose battery 18 is replaceable.

The takeoff and landing site information 320 is information on each of one or more takeoff and landing sites 30 used for the mobility service. More specifically, the takeoff and landing site information 320 includes a location (latitude and longitude) of each takeoff and landing site 30. In addition, the takeoff and landing site information 320 includes a facility ability of each takeoff and landing site 30. For example, the takeoff and landing site information 320 indicates presence or absence of the battery charging facility 32, presence or absence of the battery replacement facility 33, presence or absence of the maintenance/repair facility 34, presence or absence of the parking lot 35, and the like (see FIG. 6).

FIG. 12 shows an example of the takeoff and landing site information 320. Examples of the takeoff and landing site 30 include a dealer, a partner heliport, an eVTOL hangar, and a car rental office. The takeoff and landing site information 320 indicates presence or absence of a heliport, presence or absence of a helicopter evacuation space, presence or absence of the battery charging facility 32, presence or absence of the parking lot 35, and the latitude/longitude, for each takeoff and landing site 30.

The schedule information 330 includes at least one of a schedule of each eVTOL 10 and a schedule of each takeoff and landing site 30. The schedule of each eVTOL 10 indicates when and where each eVTOL 10 exists. For example, the schedule of each eVTOL 10 indicates a period of time when each eVTOL 10 exists at a takeoff and landing site 30, the takeoff and landing site 30, a period of time when each eVTOL 10 is in flight, a period of time when each eVTOL 10 is under maintenance, and the like. The schedule of each takeoff and landing site 30 indicates when and which eVTOL 10 is present (available) at each takeoff and landing site 30. In addition, the schedule of each takeoff and landing site 30 indicates a usage schedule and availability of the battery charging facility 32, the battery replacement facility 33, the maintenance/repair facility 34, and the like.

The flight information 340 is information on a flight of the eVTOL 10. For example, the flight information 340 includes a flight route, a position, an altitude, a flight speed, and the like of the eVTOL 10. Such the flight information 340 may be acquired in real time during the flight or may be acquired after the flight. In either case, the past flight information 340 is recorded in the database 160.

The ground mobility service management information 400 is information for managing the mobility service that utilizes the ground mobility modes 5. More specifically, the ground mobility service management information 400 indicates a type and a schedule of the ground mobility modes 5. For example, when the ground mobility modes 5 is an automobile, the ground mobility service management information 400 indicates an ID, a vehicle type, a schedule (e.g., a location, a usage status, a reservation status), and the like of the automobile.

3. Reservation Process

Figure 13:
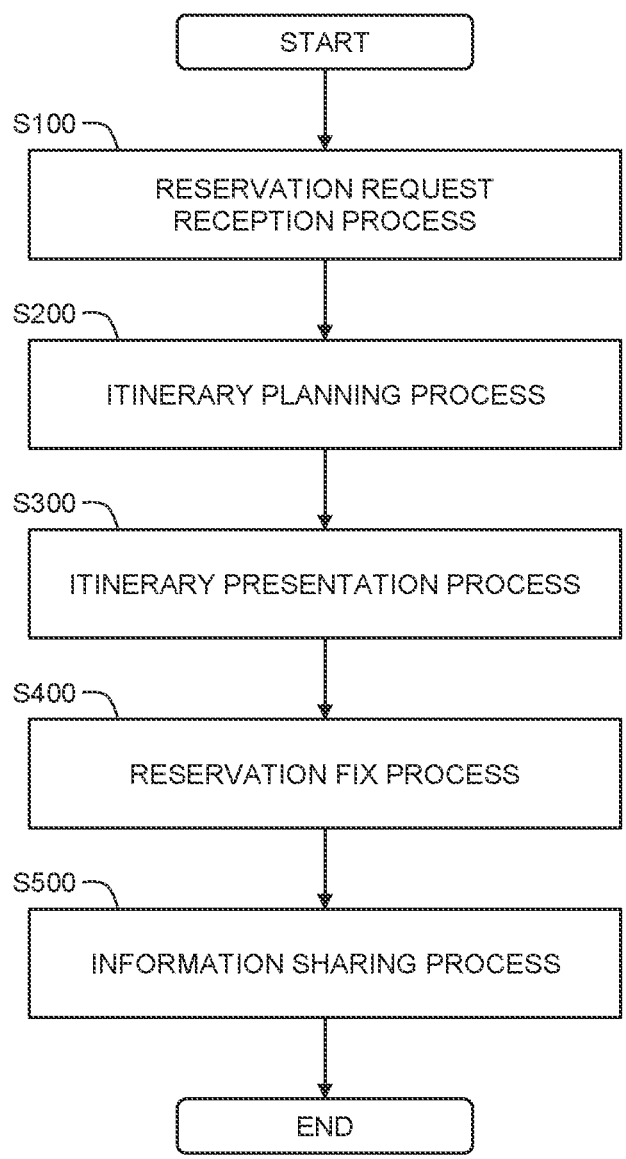
FIG. 13 is a flow chart showing a reservation process performed by a management server.

The management server 100 (i.e., the information processing device 130) according to the present embodiment executes a "reservation process" that accepts a reservation of the mobility service requested from the user U. FIG. 13 is a flow chart showing the reservation process. Hereinafter, the reservation process according to the present embodiment will be described in detail. It should be noted that the eVTOL service management information 300 and the ground mobility service management information 400 are already acquired by the above-described information acquisition process and stored in the database 160 and the memory device 150.

3-1. Step S100 (Reservation Request Reception Process)

First, the information processing device 130 executes a "reservation request reception process" that receives a reservation request REQ from the user U. For example, the reservation request REQ includes a desired date of usage, a desired time of departure, a desired time of arrival, a point of departure DEP, a destination DST, and the like. The reservation request REQ may specify a desired mobility modes (e.g., eVTOL 10). The reservation request REQ corresponds to "search information" used by the user U for searching for the mobility service.

The user U inputs the reservation request REQ (i.e., the search information) by the use of the input/output device 51 of the user terminal 50. The information processing device 53 of the user terminal 50 transmits the input reservation request REQ to the management server 100 via the communication device 52. The information processing device 130 of the management server 100 receives the reservation request REQ via the communication device 120. The information processing device 130 stores the received reservation request REQ in the memory device 150.

3-2. Step S200 (Itinerary Planning Process)

In response to the reservation request REQ, the information processing device 130 executes an "itinerary planning process" that plans an itinerary from the point of departure DEP to the destination DST. The itinerary planning process is executed based on the eVTOL service management information 300 and the ground mobility service management information 400 described above.

3-2-1. First Example

Figure 14:
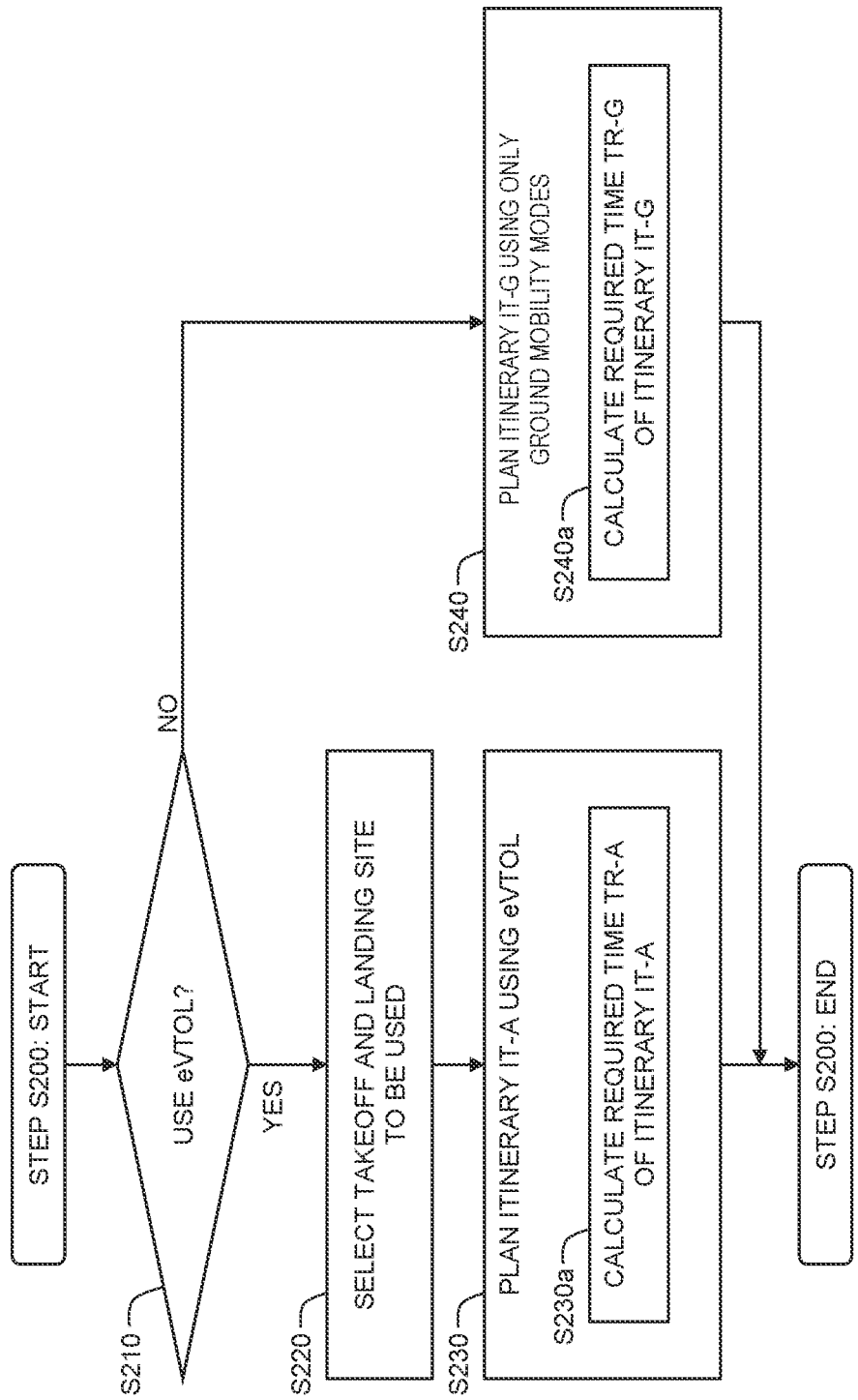
FIG. 14 is a flow chart showing a first example of an itinerary planning process (Step S200)

FIG. 14 is a flow chart showing a first example of the itinerary planning process (Step S200).

In Step S210, the information processing device 130 determines whether or not the reservation request REQ specifies the use of the eVTOL 10. In other words, the information processing device 130 determines whether or not the user U desires to use the eVTOL 10. When the use of the eVTOL 10 is specified (Step S210; Yes), the processing proceeds to Step S220. On the other hand, when the use of the eVTOL 10 is not specified (Step S210; No), the processing proceeds to Step S240.

In Step S220, the information processing device 130 selects the takeoff and landing sites 30 to be used. As described in FIG. 1, the first takeoff and landing site 30-1 is a takeoff and landing site 30 on the side of the point of departure DEP, and the second takeoff and landing site 30-2 is a takeoff and landing site 30 on the side of the destination DST. For example, the information processing device 130 sets a takeoff and landing site 30 nearest to the point of departure DEP as the first takeoff and landing site 30-1, and sets a takeoff and landing site 30 nearest to the destination DST as the second takeoff and landing site 30-2. The location (latitude and longitude) of each takeoff and landing site 30 is included in the takeoff and landing site information 320. Therefore, the information processing device 130 can select (set) the takeoff and landing sites 30 to be used, based on the takeoff and landing site information 320 and the point of departure DEP and the destination DST indicated by the reservation request REQ.

Figure 15:
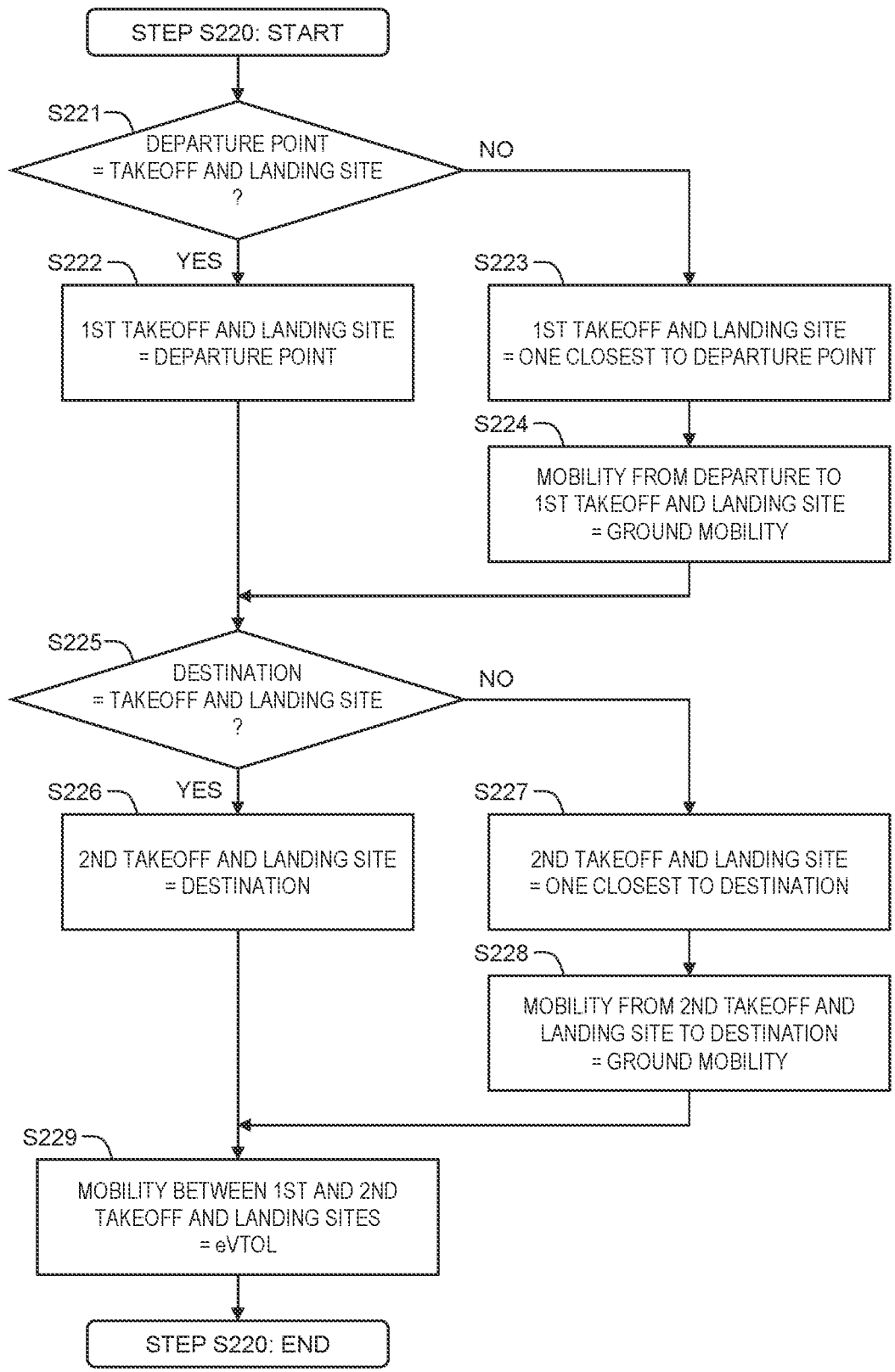
FIG. 15 is a flow chart showing an example of Step S220.

FIG. 15 is a flow chart showing an example of Step S220.

In Step S221, the information processing device 130 determines whether or not the point of departure DEP is any takeoff and landing site 30. When the point of departure DEP is any takeoff and landing site 30 (Step S221; Yes), the information processing device 130 sets the point of departure DEP as the first takeoff and landing site 30-1 (Step S222). On the other hand, when the point of departure DEP is not a takeoff and landing site 30 (Step S221; No), the information processing device 130 sets a takeoff and landing site 30 nearest to the point of departure DEP as the first takeoff and landing site 30-1 (Step S223). In other words, the information processing device 130 adds the takeoff and landing site 30 nearest to the point of departure DEP as a transfer point. Then, the information processing device 130 sets the mobility modes from the point of departure DEP to the first takeoff and landing site 30-1 to the ground mobility modes 5 such as an automobile (Step S224).

In Step S225, the information processing device 130 determines whether or not the destination DST is any takeoff and landing site 30. When the destination DST is any takeoff and landing site 30 (Step S225; Yes), the information processing device 130 sets the destination DST as the second takeoff and landing site 30-2 (Step S226). On the other hand, when the destination DST is not a takeoff and landing site 30 (Step S225; No), the information processing device 130 sets a takeoff and landing site 30 nearest to the destination DST as the second takeoff and landing site 30-2 (Step S227). In other words, the information processing device 130 adds the takeoff and landing site 30 nearest to the destination DST as a transfer point. Then, the information processing device 130 sets the mobility modes from the second takeoff and landing site 30-2 to the destination DST to the ground mobility modes 5 such as an automobile (Step S228).

In Step S229, the information processing device 130 sets the mobility modes from the first takeoff and landing site 30-1 to the second takeoff and landing site 30-2 to the eVTOL 10. After that, the processing proceeds to Step S230.

In Step S230, the information processing device 130 plans (creates) the "itinerary IT_A" that uses the eVTOL 10. The itinerary IT_A includes a flight from the first takeoff and landing site 30-1 to the second takeoff and landing site 30-2. For example, the itinerary IT_A is a combination of the itinerary IT_G1 to move from the point of departure DEP to the first takeoff and landing site 30-1 by the ground mobility modes 5, the itinerary IT_F to move from the first takeoff and landing site 30-1 to the second takeoff and landing site 30-2 by the eVTOL 10, and the itinerary IT_G2 to move from the second takeoff and landing site 30-2 to the destination DST by the ground mobility modes 5 (see FIG. 1). The information processing device 130 can plan the itinerary IT_A based on the eVTOL service management information 300 (especially, the schedule information 330) and the ground mobility service management information 400.

In addition, in Step S230, the information processing device 130 calculates a required time TR-A from the point of departure DEP to the destination DST in the case of the itinerary IT-A (Step S230a).

On the other hand, in Step S240, the information processing device 130 plans (creates) the "itinerary IT_G" that uses only the ground mobility modes 5 (see FIG.1). The information processing device 130 can plan the itinerary IT_G based on the ground mobility service management information 400.

In addition, in Step S240, the information processing device 130 calculates a required time TR-G from the point of departure DEP to the destination DST in the case of the itinerary IT-G (Step S240a).

3-2-2. Second Example

Figure 16:
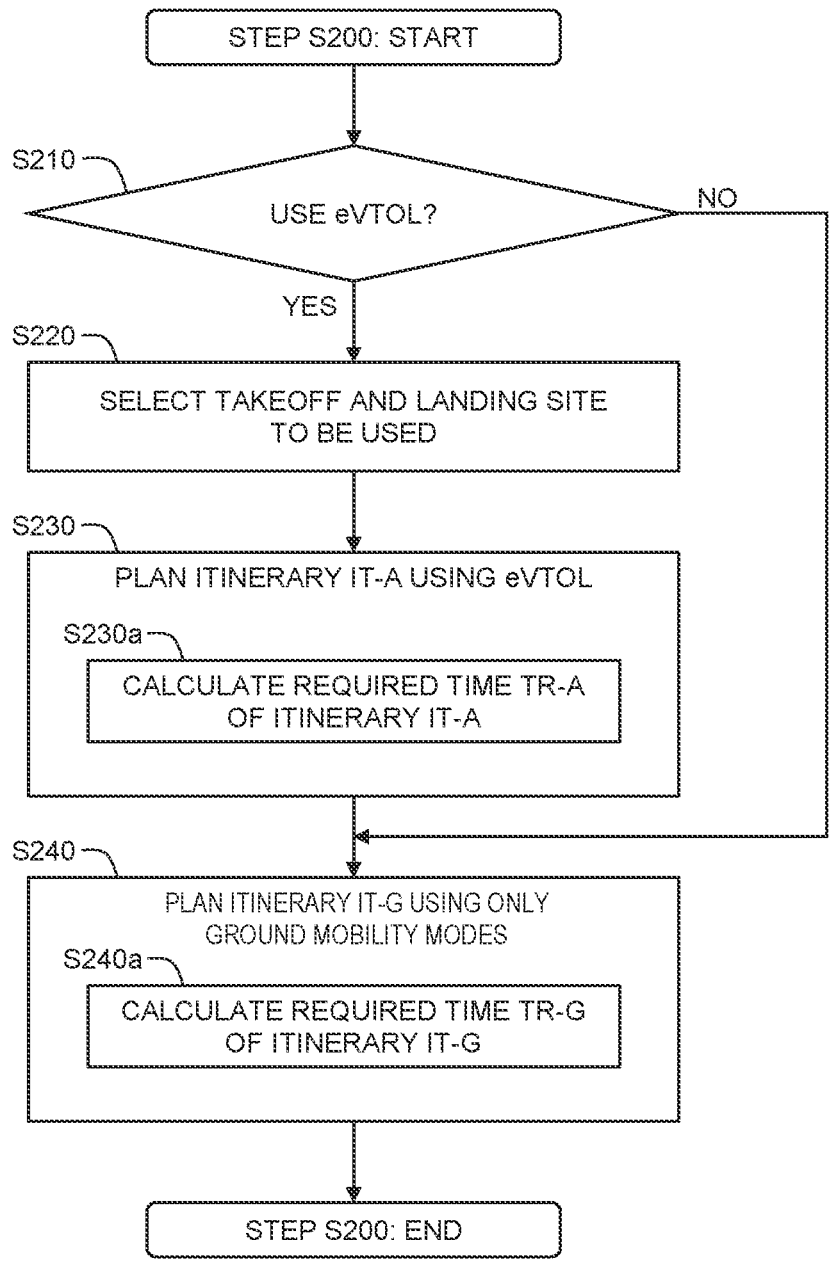
FIG. 16 is a flow chart showing a second example of the itinerary planning process (Step S200)

FIG. 16 is a flow chart showing a second example of the itinerary planning process (Step S200). An overlapping description with the first example described in FIG. 14 will be omitted. When the use of the eVTOL 10 is specified (Step S210; Yes), only the itinerary IT-A is planned in the case of the first example, but in the second example, both the itinerary IT_A and the itinerary IT_G are planned. To that end, Step S240 is performed after Step S230. Since both the itinerary IT_A and the itinerary IT_G are planned, it is possible in an itinerary presentation process (Step S300) described later to present both the itinerary IT_A and the itinerary IT_G such that the user U is able to compare them.

3-2-3. Third Example

Figure 17:
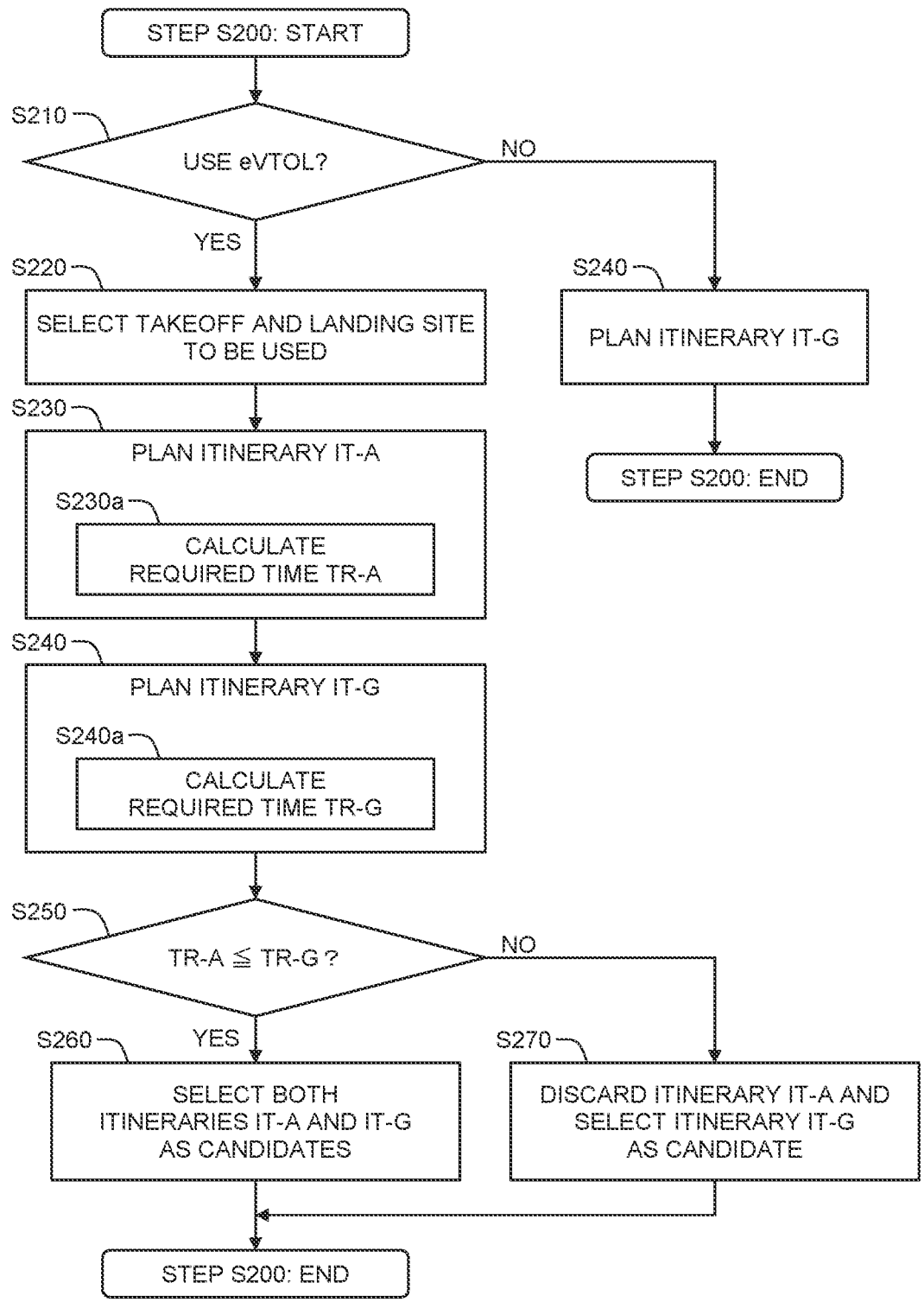
FIG. 17 is a flow chart showing a third example of the itinerary planning process (Step S200)

FIG. 17 is a flow chart showing a third example of the itinerary planning process (Step S200). The third example is a modification example of the second example shown in FIG. 16. As described above, when the use of the eVTOL 10 is specified (Step S210; Yes), the information processing device 130 plans both the itinerary IT-A and the itinerary IT-G (Steps S230 and S240). Furthermore, in Step S250, the information processing device 130 compares the required time TR-A of the itinerary IT-A and the required time TR-G of the itinerary IT-G. When the required time TR-A is equal to or less than the required time TR-G (Step S250; Yes), the information processing device 130 selects both the itinerary IT-A and the itinerary IT-G as candidates (Step S260). On the other hand, when the required time TR-A is longer than the required time TR-G (Step S250; No), the information processing device 130 discards the itinerary IT-A and selects the itinerary IT-G as a candidate (Step S270).

3-2-4. Itinerary Information

The itinerary information 230 indicates the itinerary planned by the itinerary planning process. For example, the itinerary information 230 includes the point of departure DEP, the destination DST, the route, the mobility modes to be used, the takeoff and landing sites 30 to be used, the time of departure, the time of arrival, the required time from the point of departure DEP to the destination DST, and the like. The information processing device 130 stores the generated itinerary information 230 in the memory device 150.

The information processing device 130 may further generate the fee information 240 together with the itinerary information 230. The fee information 240 indicates the usage fee when the mobility service of the generated itinerary is used. The information processing device 130 stores the generated fee information 240 in the memory device 150.

3-3. Step S300 (Itinerary Presentation Process)

After the itinerary information 230 is generated by the itinerary planning process (Step S200), the information processing device 130 executes an "itinerary presentation process" that presents the itinerary information 230 to the user U.

More specifically, the information processing device 130 transmits the itinerary information 230 to the user terminal 50 via the communication device 120. The information processing device 53 of the user terminal 50 receives the itinerary information 230 via the communication device 52. The information processing device 53 stores the itinerary information 230 in the memory device 55. Moreover, the information processing device 53 presents the itinerary information 230 to the user U through the input/output device 51. Typically, the itinerary information 230 is displayed on the display device.

Figure 18:
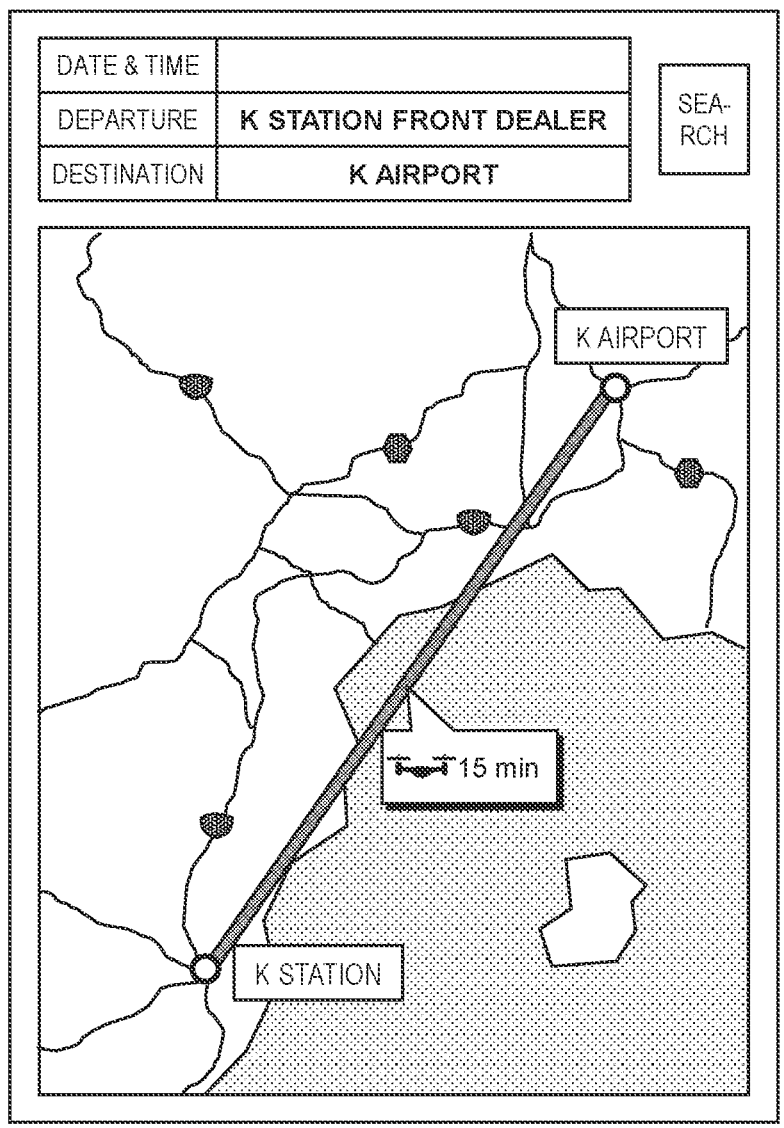
FIG. 18 is a conceptual diagram showing an example of information displayed on a display device in an itinerary presentation process (Step S300)

FIG. 18 is a conceptual diagram showing an example of information displayed on the display device. For simplicity, it is assumed that the point of departure DEP is the first takeoff and landing site 30-1 (e.g., K Station Front Dealer) and the destination DST is the second takeoff and landing site 30-2 (e.g., K Airport). In the example shown in FIG. 18, information of the itinerary IT_A utilizing the eVTOL 10 is displayed on the display device. More specifically, a map, the point of departure DEP, the destination DST, the route, the mobility modes (i.e., the eVTOL 10), and the required time TR-A (e.g., 15 minutes) from the point of departure DEP to the destination DST are displayed.

Figure 19:
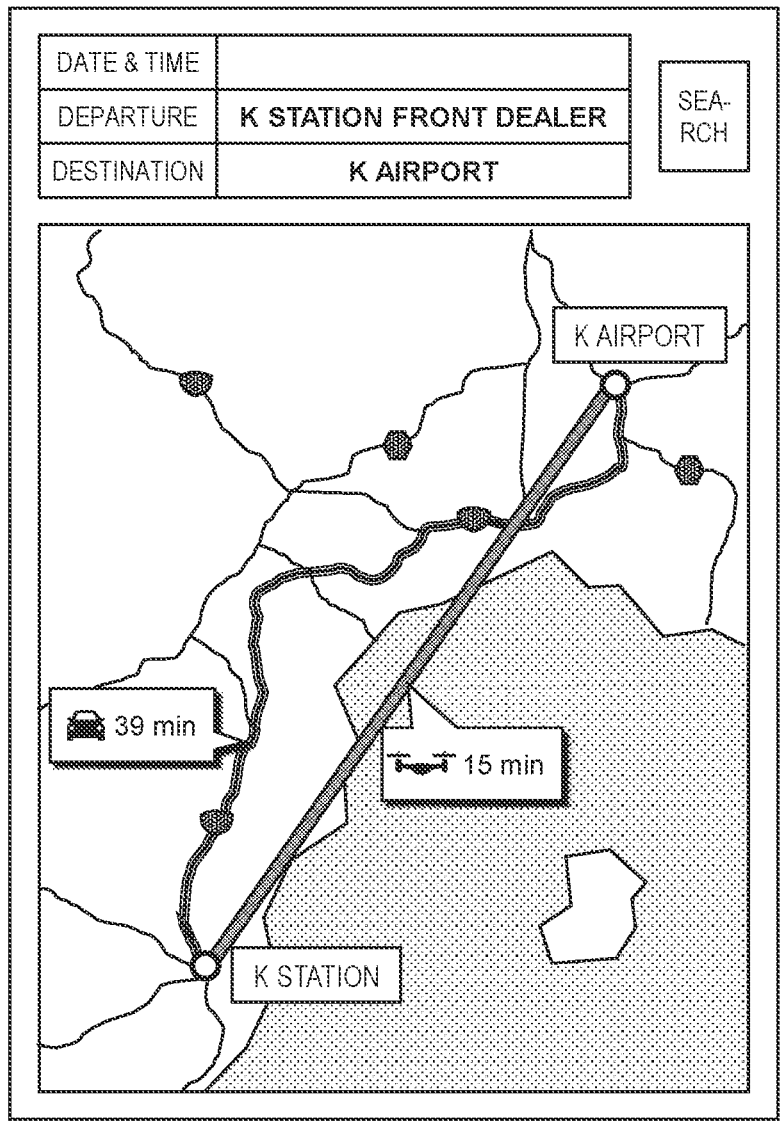
FIG. 19 is a conceptual diagram showing another example of information displayed on the display device in the itinerary presentation process (Step S300)

FIG. 19 is a conceptual diagram showing another example of information displayed on the display device. In the example shown in FIG. 19, information of both the itinerary IT_A and the itinerary IT_G is displayed. For example, in the case of the itinerary IT_G, the automobile is utilized and the required time TR-G from the point of departure DEP to the destination DST is 39 minutes. The user U can make a comparison of the itinerary IT_A and the itinerary IT_G.

As yet another example, only the itinerary with the shorter required time may be selectively displayed. In the same situation as shown in FIG. 19, only the information of the itinerary IT_A is selectively displayed. The information processing device 130 of the management server 100 may selectively transmit only the itinerary information 230 having the shorter required time to the user terminal 50. Alternatively, the information processing device 53 of the user terminal 50 may select the itinerary information 230 having the shorter required time.

The information processing device 130 may present the fee information 240 together with the itinerary information 230 to the user U. A method of presenting the fee information 240 is the same as in the case of the itinerary information 230.

3-4. Step S400 (Reservation Fix Process)

The user U considers the presented itinerary information 230 to determine whether or not to fix the reservation. When multiple itineraries are presented, the user U selects one from the multiple itineraries. For example, the user U makes a decision and choice by referring to the required time and the usage fee. When not approving the presented itinerary information 230, the user U may change the reservation request REQ. In that case, the processing returns to Step S100.

When fixing the reservation, the user U uses the input/output device 51 of the user terminal 50 to instruct to fix the reservation. When multiple itineraries are presented, the user U specifies one of the multiple itineraries. The information processing device 53 of the user terminal 50 transmits a reservation fix request to the management server 100 via the communication device 52. The information processing device 130 of the management server 100 receives the reservation fix request via the communication device 120.

In response to the reservation fix request, the information processing device 130 fixes the itinerary information 230 and the fee information 240. In addition, the information processing device 130 generates the authentication information 250. Then, the information processing device 130 generates the reservation information 220 including the itinerary information 230, the fee information 240, and the authentication information 250 (see FIG. 10). The information processing device 130 stores the reservation information 220 in the memory device 150.

Further, the information processing device 130 updates the schedule information 330 by reflecting the fixed itinerary information 230 in the schedule information 330. That is, the information processing device 130 reflects the schedules of the eVTOL 10 and the takeoff and landing sites 30 used in the fixed itinerary in the schedule information 330.

3-5. Step S500 (Information Sharing Process)

The information processing device 130 of the management server 100 transmits the reservation information 220 to the user terminal 50 via the communication device 120. The information processing device 53 of the user terminal 50 receives the reservation information 220 via the communication device 52. The information processing device 53 stores the reservation information 220 in the memory device 55.

The information processing device 130 of the management server 100 may transmit the user information 200 including the name of the user U, the user ID, and the itinerary information 230 to the reserved eVTOL 10. The information processing device 13 of the reserved eVTOL 10 receives the user information 200 via the communication device 12. The information processing device 13 stores the user information 200 in the memory device 15.

Similarly, the information processing device 130 of the management server 100 may transmit the user information 200 to the pilot terminal 20 used by the pilot of the reserved eVTOL 10. The information processing device 23 of the pilot terminal 20 receives the user information 200 via the communication device 22. The information processing device 23 stores the user information 200 in the memory device 25.

Similarly, the information processing device 130 of the management server 100 may transmit the user information 200 to the local terminal 40 installed in the reserved takeoff and landing site 30. The information processing device 43 of the local terminal 40 receives the user information 200 via the communication device 42. The information processing device 43 stores the user information 200 in the memory device 45.

4. Check-In Process (Pick Up)

At the first takeoff and landing site 30-1, the eVTOL 10 picks up the user U. That is, at the first takeoff and landing site 30-1, the user U boards the reserved eVTOL 10. After the user U boards the eVTOL 10, the eVTOL 10 takes off.

Before the boarding, a "user authentication process" that authenticates the user U may be performed. As an example, the user authentication process performed by the pilot terminal 20 and the management server 100 will be described. The same applies to a case where the eVTOL 10 or the local terminal 40 is used instead of the pilot terminal 20.

First, the user U provides the pilot terminal 20 with the authentication information 250 stored in the user terminal 50. For example, the communication device 52 of the user terminal 50 and the communication device 22 of the pilot terminal 20 perform the near field communication, and thereby the authentication information 250 is transmitted from the user terminal 50 to the pilot terminal 20. As another example, in a case where the authentication information 250 is a QR code, the user U may display the QR code on the display device. In this case, the camera or the like of the pilot terminal 20 reads the QR code displayed on the display device of the user terminal 50.

The information processing device 23 of the pilot terminal 20 transmits the acquired authentication information 250 to the management server 100. The information processing device 130 of the management server 100 authenticates the user U by checking the received authentication information 250 against the reservation information 220 stored in the memory device 150. Then, the information processing device 130 transmits the authentication result to the pilot terminal 20. The information processing device 23 of the pilot terminal 20 receives the authentication result. Alternatively, when the pilot terminal 20 holds the reservation information 220, the information processing device 23 may authenticate the user U by checking the authentication information 250 against the reservation information 220.

5. Reservation Process for Increasing Service Delivery Opportunity 5-1. Outline

A situation where the user U makes a reservation of the mobility service including a flight utilizing the eVTOL 10 is considered. As described above, the information processing device 130 of the management server 100 executes the reservation process in response to the reservation request REQ from the user U (see Section 3). In the reservation process, the information processing device 130 plans the itinerary IT_A according to the reservation request REQ and presents the planned itinerary IT_A to the user U.

Figure 20:
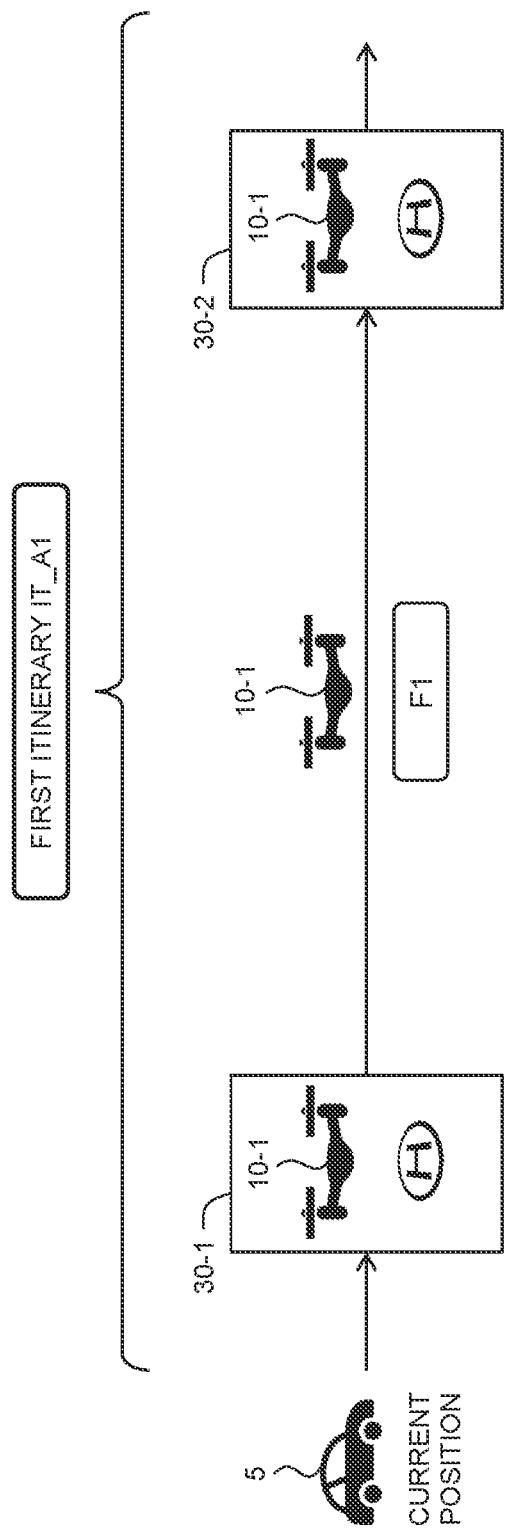
FIG. 20 is a conceptual diagram for explaining an example of a first itinerary utilizing an eVTOL.

FIG. 20 is a conceptual diagram for explaining an example of the itinerary IT_A utilizing the eVTOL 10. A first takeoff and landing site 30-1 is a takeoff and landing site 30 nearest to the point of departure DEP, and a second takeoff and landing site 30-2 is a takeoff and landing site 30 nearest to the destination DST. A first eVTOL 10-1 is an eVTOL 10 that is available at the first takeoff and landing site 30-1. A flight from the first takeoff and landing site 30-1 to the second takeoff and landing site 30-2 by the first eVTOL 10-1 is hereinafter referred to as a "first flight F1." The itinerary IT_A including the first flight F1 is hereinafter referred to as a "first itinerary IT_A1."

As a matter of course, it is desirable that the first itinerary IT_A1 can be secured in response to the reservation request REQ from the user U. However, there may be a case where the first eVTOL 10-1 available at a time of use desired by the user U is limited. Moreover, an amount of battery charge of the available first eVTOL 10-1 is not always sufficient for carrying out the first flight F1.

For example, as shown in FIG. 20, there is a case where the user U desires to make a reservation of a near-future flight during moving by the ground mobility modes 5 such as ride sharing. When not so much time has passed since the last use of the first eVTOL 10-1, it is not possible to sufficiently secure a time for charging the first eVTOL 10-1. Even if charging the first eVTOL 10-1 is continued until the user U arrives at the first takeoff and landing site 30-1, the amount of battery charge of the first eVTOL 10-1 may not become sufficient.

The same applies not only to the reservation made on the day of use but also to a reservation made before the day of use. Depending on an operation schedule of the first eVTOL 10-1, a case where the amount of battery charge of the first eVTOL 10-1 at a time of start of use by the user U is not sufficient can occur.

For the purpose of convenience, the amount of battery charge of the first eVTOL 10-1 at the time of start of use by the user U is hereinafter referred to as a "first amount of battery charge." The first amount of battery charge can be estimated from the reservation request REQ from the user U, the schedule of the first eVTOL 10-1, and a charging ability of the battery charging facility 32 of the first takeoff and landing site 30-1. The first eVTOL 10-1 may be charged until right before the start of use by the user U.

"The first amount of battery charge is sufficient" means that "the first flight F1 from the first takeoff and landing site 30-1 to the second takeoff and landing site 30-2 by the first eVTOL 10-1 is achievable with the first amount of battery charge." "The first flight F1 from the first takeoff and landing site 30-1 to the second takeoff and landing site 30-2 by the first eVTOL 10-1 is achievable with the first amount of battery charge" means that "the first eVTOL 10-1 is able to fly at least from the first takeoff and landing site 30-1 to the second takeoff and landing site 30-2 with the first amount of battery charge." Alternatively, "the first flight F1 from the first takeoff and landing site 30-1 to the second takeoff and landing site 30-2 by the first eVTOL 10-1 is achievable with the first amount of battery charge" may mean that "with the first amount of battery charge, the first eVTOL 10-1 is able to fly from the first takeoff and landing site 30-1 to the second takeoff and landing site 30-2 and, if the second takeoff and landing site 30-2 is not available when landing, fly to an emergency landing point around the second takeoff and landing site 30-2." The emergency landing point is for example a takeoff and landing site 30 nearest to the second takeoff and landing site 30-2.

Explanation from another point of view is as follows. A "minimum amount of battery charge" is an amount of battery charge required for the first eVTOL 10-1 to fly from the first takeoff and landing site 30-1 to the second takeoff and landing site 30-2. A "margin amount of battery charge" is an amount of battery charge required for the first eVTOL 10-1 to fly to the emergency landing point around the second takeoff and landing site 30-2 if the second takeoff and landing site 30-2 is not available when landing. "The first amount of battery charge is sufficient" means that "the first amount of battery charge is equal to or more than a threshold." The threshold is set to be equal to or more than the minimum amount of battery charge. The threshold may be set to a sum of the minimum amount of battery charge and the margin amount of battery charge. The threshold may be set to to be equal to or more than the sum of the minimum amount of battery charge and the margin amount of battery charge.

When the first amount of battery charge is sufficient, it is possible to secure the first itinerary IT_A1 including the first flight F1 from the first takeoff and landing site 30-1 to the second takeoff and landing site 30-2 by the first eVTOL 10-1. However, when the first amount of battery charge is not sufficient, it is not possible to plan the first itinerary IT_A1. Rejecting the reservation just because the first itinerary IT_A1 cannot be planned leads to decrease in service delivery opportunity.

In view of the above, according to the present embodiment, when the first amount of battery charge is not sufficient, the information processing device 130 plans a "second itinerary IT_A2" instead of the first itinerary IT_A1. The second itinerary IT_A2 includes transit at a transit point located between the first takeoff and landing site 30-1 and the second takeoff and landing site 30-2.

Figure 21:
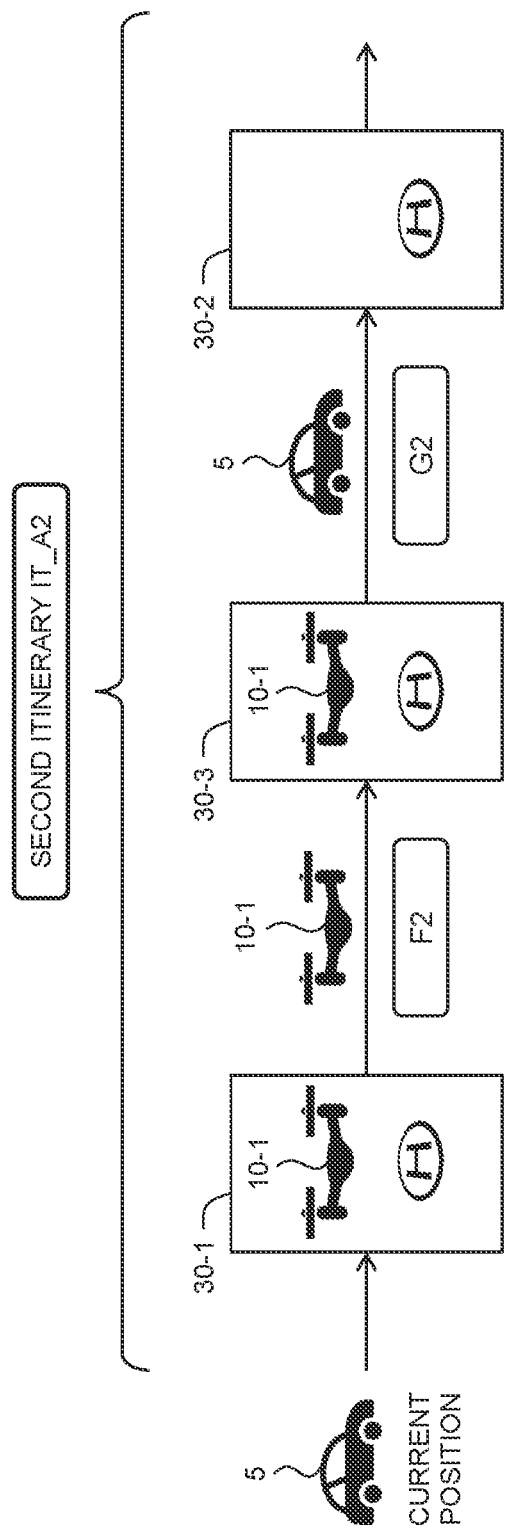
FIG. 21 is a conceptual diagram for explaining an example of a second itinerary utilizing an eVTOL.

FIG. 21 is a conceptual diagram for explaining an example of the second itinerary IT_A2. A third takeoff and landing site 30-3 is a transit point located between the first takeoff and landing site 30-1 and the second takeoff and landing site 30-2. A second flight F2 from the first takeoff and landing site 30-1 to the third takeoff and landing site 30-3 by the first eVTOL 10-1 is achievable with the first amount of battery charge. Conversely, the third takeoff and landing site 30-3 is searched for within a range achievable with the first amount of battery charge. The second itinerary IT_A2 goes through the third takeoff and landing site 30-3. More specifically, the second itinerary IT_A2 includes a combination of the second flight F2 from the first takeoff and landing site 30-1 to the third takeoff and landing site 30-3 by the first eVTOL 10-1 and a ground travel G2 from the third takeoff and landing site 30-3 to the second takeoff and landing site 30-2 by an automobile (ground mobility modes 5).

Figure 22:
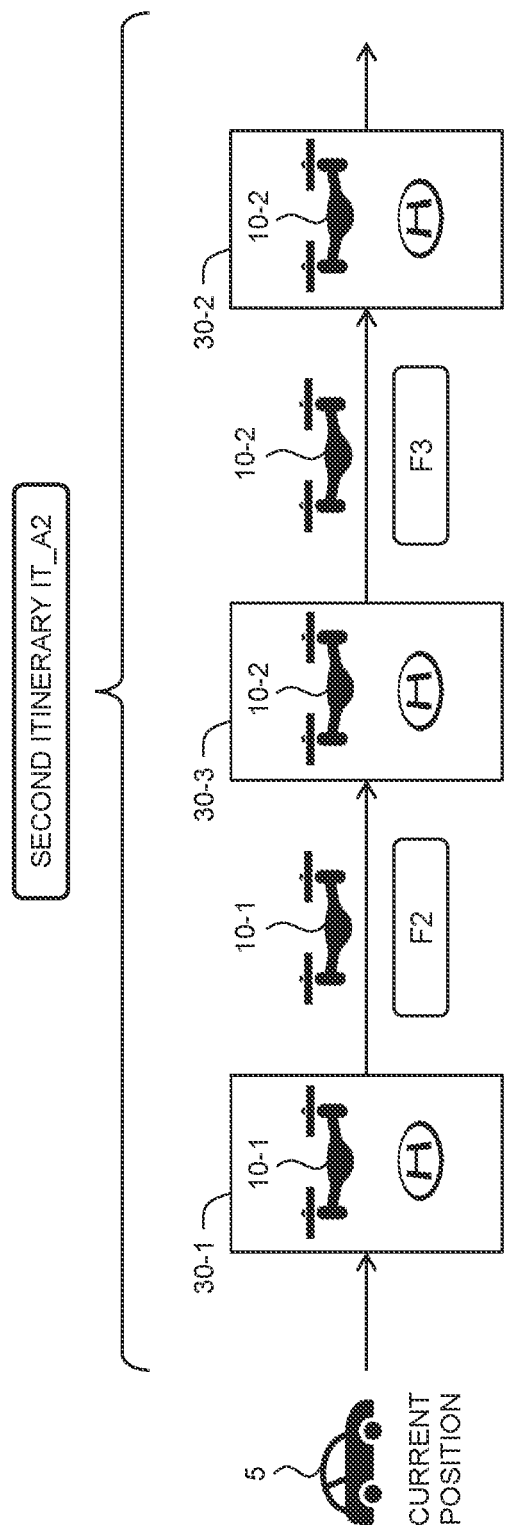
FIG. 22 is a conceptual diagram for explaining another example of a second itinerary utilizing an eVTOL.

FIG. 22 is a conceptual diagram for explaining another example of the second itinerary IT_A2. The third takeoff and landing site 30-3 and the second flight F2 are the same as in the case of FIG. 21. A second eVTOL 10-2 is an eVTOL 10 that is available at the third takeoff and landing site 30-3. An amount of battery charge (a second amount of battery charge) of the second eVTOL 10-2 is sufficient for carrying out a third flight F3 from the third takeoff and landing site 30-3 to the second takeoff and landing site 30-2. The second itinerary IT_A2 includes a combination of the second flight F2 from the first takeoff and landing site 30-1 to the third takeoff and landing site 30-3 by the first eVTOL 10-1 and the third flight F3 from the third takeoff and landing site 30-3 to the second takeoff and landing site 30-2 by the second eVTOL 10-2.

According to the present embodiment, as described above, when the first flight F1 from the first takeoff and landing site 30-1 to the second takeoff and landing site 30-2 by the first eVTOL 10-1 is not achievable with the first amount of battery charge, the second itinerary IT_A2 going through the third takeoff and landing site 30-3 is planned. As a result, a probability of being able to accept the reservation requested by the user U increases. Therefore, opportunities for the mobility service utilizing the eVTOL 10 increase. This contributes to further increase in convenience of the mobility service.

5-2. Process Flow

Figure 23:
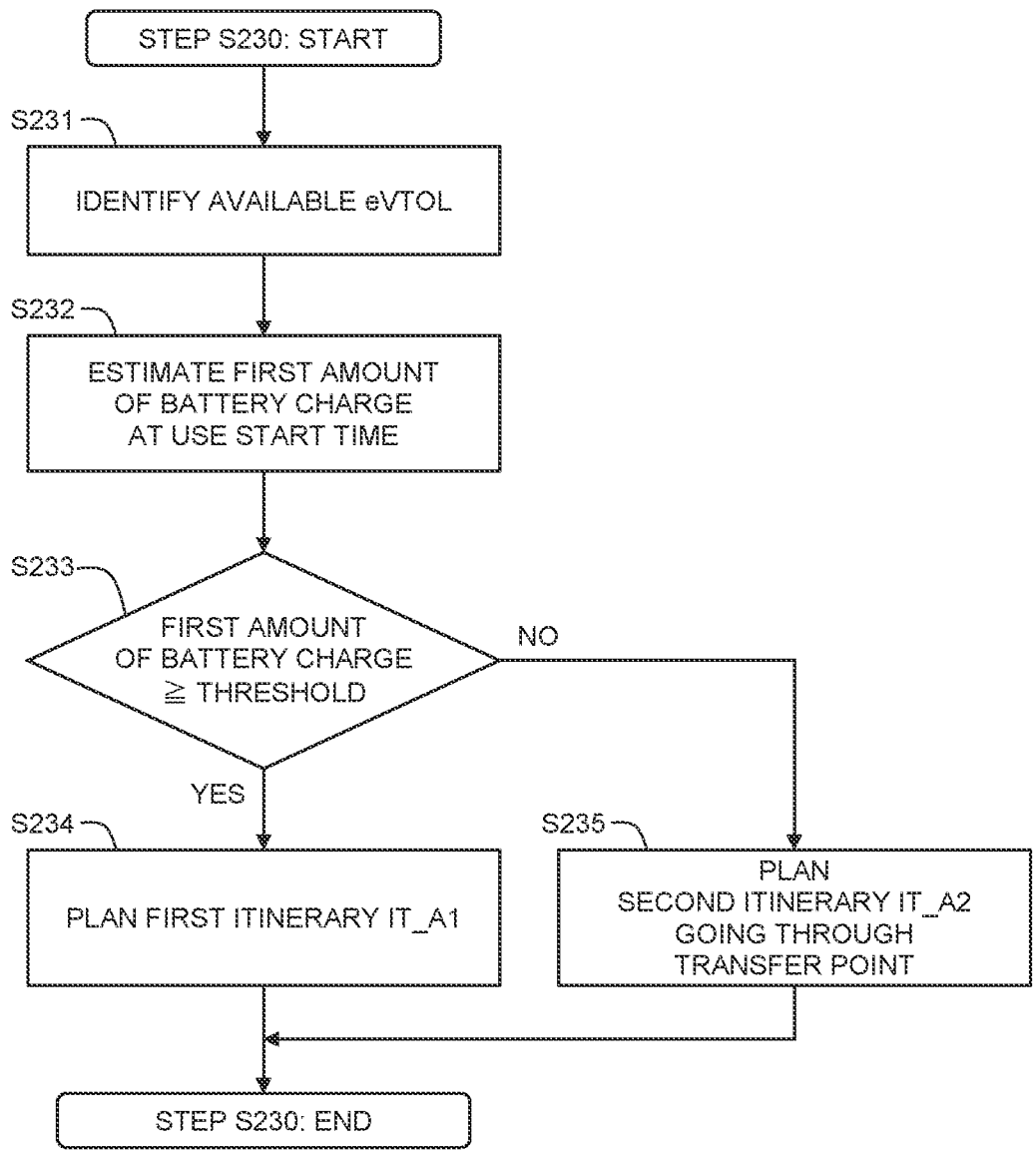
FIG. 23 is a flow chart showing an example of a process (Step S230) of planning an itinerary utilizing an eVTOL.

FIG. 23 is a flow chart showing an example of the process (Step S230) of planning the itinerary IT_A utilizing the eVTOL 10.

In Step S231, the information processing device 130 identifies the first eVTOL 10-1 that is available at the first takeoff and landing site 30-1 at a time of use desired by the user U. The schedule of each eVTOL 10 is obtained from the schedule information 330. Therefore, the information processing device 130 is able to identify the available first eVTOL 10-1 based on the reservation request REQ and the schedule information 330.

In Step S232, the information processing device 130 estimates the first amount of battery charge of the first eVTOL 10-1 at the time of start of use by the user U. The first amount of battery charge can be estimated from the time of start of use by the user U, the schedule of the first eVTOL 10-1, and a charging ability of the battery charging facility 32 of the first takeoff and landing site 30-1. The time of start of use by the user U is obtained from the reservation request REQ. Alternatively, a time when the user U arrives at the first takeoff and landing site 30-1 may be regarded as the time of start of use by the user U. For example, when the user U makes a reservation on the way to the first takeoff and landing site 30-1 by ride sharing (see FIG. 20), it is possible to estimate a time of arrival based on a positional relationship between the current position and the first takeoff and landing site 30-1. The schedule of the first eVTOL 10-1 is obtained from the schedule information 330. The charging ability of the battery charging facility 32 of the first takeoff and landing site 30-1 is obtained from the takeoff and landing site information 320.

In Step S233, the information processing device 130 makes a comparison between the first amount of battery charge and the threshold. As described above, the minimum amount of battery charge is an amount of battery charge minimum required for the first eVTOL 10-1 to fly from the first takeoff and landing site 30-1 to the second takeoff and landing site 30-2. The margin amount of battery charge is an amount of battery charge required for the first eVTOL 10-1 to fly to the emergency landing point around the second takeoff and landing site 30-2 if the second takeoff and landing site 30-2 is not available when landing. The threshold is set to be equal to or more than the minimum amount of battery charge. The threshold may be set to a sum of the minimum amount of battery charge and the margin amount of battery charge. The threshold may be set to to be equal to or more than the sum of the minimum amount of battery charge and the margin amount of battery charge.

When the first amount of battery charge is equal to or more than the threshold (Step S233; Yes), the information processing device 130 determines that the first flight F1 from the first takeoff and landing site 30-1 to the second takeoff and landing site 30-2 is achievable with the first amount of battery charge. In this case, the processing proceeds to Step S234.

In Step S234, the information processing device 130 plans the first itinerary IT_A1 including the first flight F1 (see FIG. 20). After that, in Step S300 (the itinerary presentation process), the information processing device 130 presents the user U with the first itinerary IT_A1.

On the other hand, when the first amount of battery charge is less than the threshold (Step S233; No), the information processing device 130 determines that it is not possible to carry out the first flight F1 with the first amount of battery charge. In this case, the processing proceeds to Step S235.

In Step S235, the information processing device 130 searches for the second flight F2 from the first takeoff and landing site 30-1 to the third takeoff and landing site 30-3 that is achievable with the first amount of battery charge. Conversely, the information processing device 130 searches for the third takeoff and landing site 30-3 within a range achievable with the first amount of battery charge. The location of each takeoff and landing site 30 is obtained from the takeoff and landing site information 320. Then, the information processing device 130 plans the second itinerary IT_A2 that goes through the third takeoff and landing site 30-3 as the transit point (see FIGS. 21 and 22). The second itinerary IT_A2 includes a combination of the second flight F2 from the first takeoff and landing site 30-1 to the third takeoff and landing site 30-3 by the first eVTOL 10-1 and movement from the third takeoff and landing site 30-3 to the second takeoff and landing site 30-2 by a transportation different from the first eVTOL 10-1. After that, in Step S300 (the itinerary presentation process), the information processing device 130 presents the user U with the second itinerary IT_A2.

5-3. Modification Examples

Figure 24:
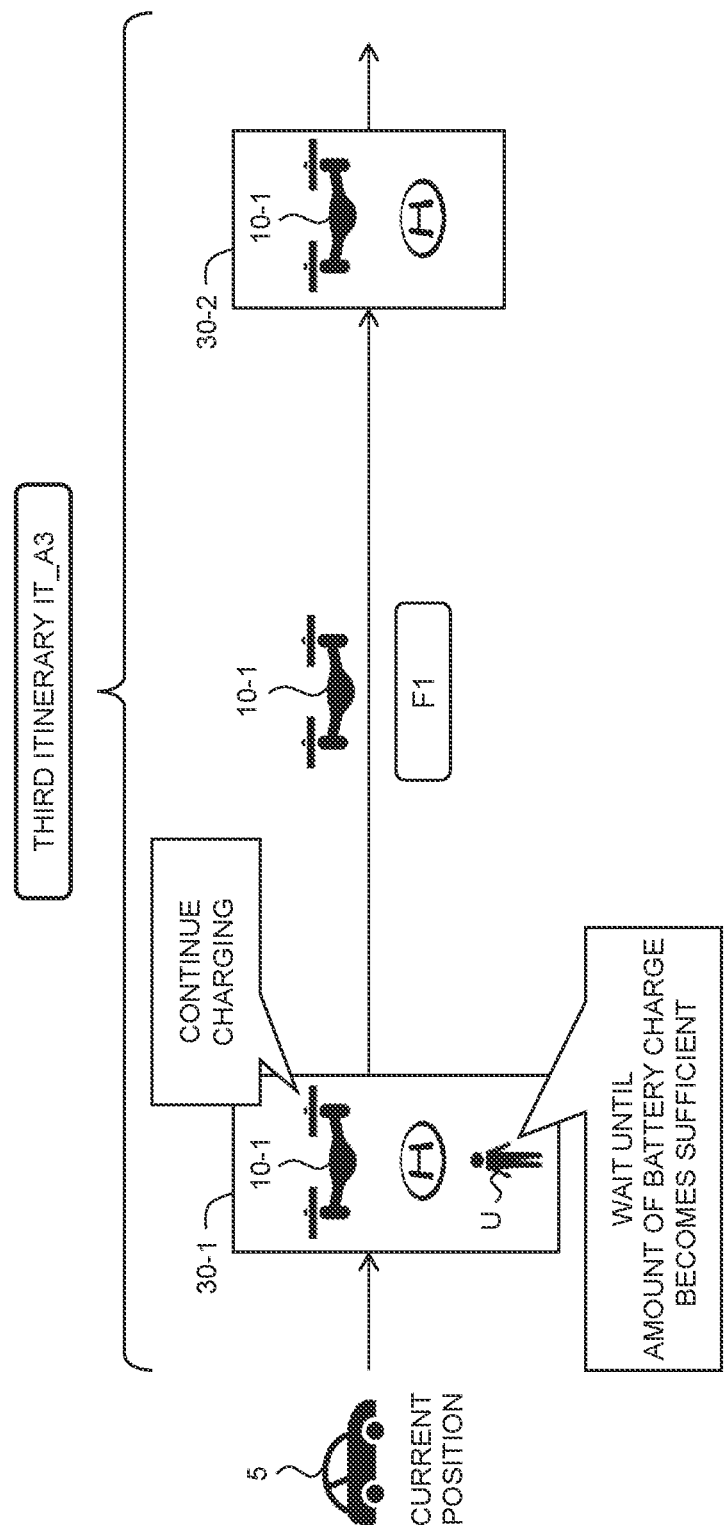
FIG. 24 is a conceptual diagram for explaining a third itinerary utilizing an eVTOL.

FIG. 24 is a conceptual diagram for explaining a third itinerary IT_A3. In the third itinerary IT_A3, charging of the first eVTOL 10-1 is continued until the first flight F1 becomes achievable. That is, charging of the first eVTOL 10-1 is continued until the amount of battery charge of the first eVTOL 10-1 becomes equal to or more than the threshold. Meanwhile, the user U waits at the first takeoff and landing site 30-1. Then, after the amount of battery charge of the first eVTOL 10-1 becomes equal to or more than the threshold, the first flight F1 from the first takeoff and landing site 30-1 to the second takeoff and landing site 30-2 by the first eVTOL 10-1 is performed.

Figure 25:
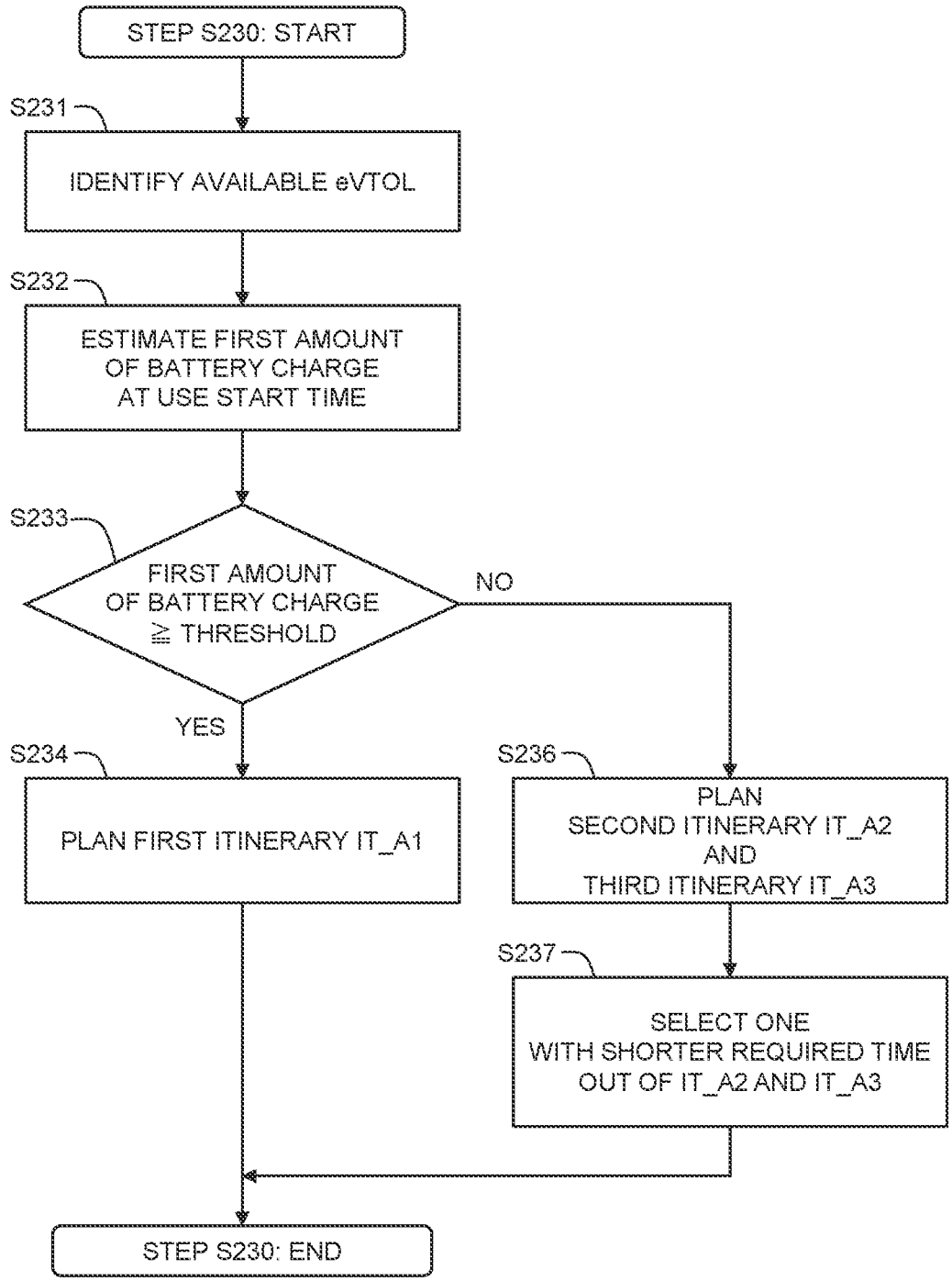
FIG. 25 is a flow chart showing a modification example of a process (Step S230) of planning an itinerary utilizing an eVTOL.

FIG. 25 is a flow chart showing processing according to a modification example. Steps S231 to S234 are the same as in the case of FIG. 23 described above.

When the first amount of battery charge is less than the threshold (Step S233; No), the information processing device 130 determines that it is not possible to carry out the first flight F1 with the first amount of battery charge. In this case, the processing proceeds to Step S236.

In Step S236, the information processing device 130 plans the third itinerary IT_A3 in addition to the second itinerary IT_A2.

In Step S237, the information processing device 130 compares the required time of the second itinerary IT_A2 and the required time of the third itinerary IT_A3. Then, the information processing device 130 selects one having a shorter required time out of the second itinerary IT_A2 and the third itinerary IT_A3. After that, in Step S300 (the itinerary presentation process), the information processing device 130 presents the user U with the selected itinerary whose required time is shorter.

Figure 26:
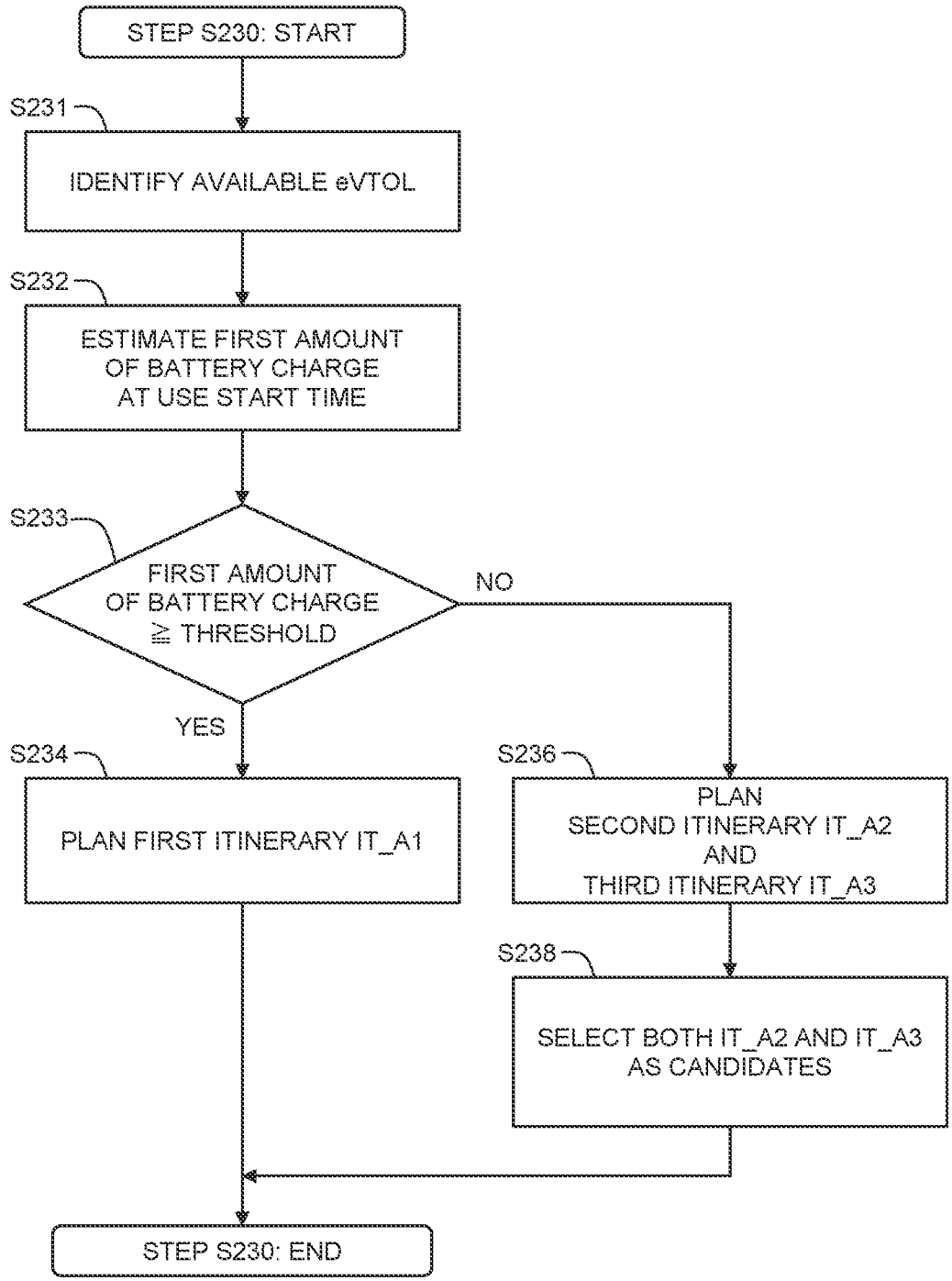
FIG. 26 is a flow chart showing another modification example of a process (Step S230) of planning an itinerary utilizing an eVTOL.

FIG. 26 is a flow chart showing processing according to another modification example. Steps S231 to S236 are the same as in the case of FIG. 25 described above.

In Step S238 subsequent to Step S236, the information processing device 130 selects both the second itinerary IT_A2 and the third itinerary IT_A3 as itinerary candidates. After that, in Step S300 (the itinerary presentation process), the information processing device 130 presents the user U with both the second itinerary IT_A2 and the third itinerary IT_A3. The user U is able to choose a preferred itinerary.

6. Others

In the above description, the processing by the information processing device 130 of the management server 100 is mainly described. The same functions as the information processing device 130 of the management server 100 may be achieved by another component. For example, the information processing device 43 of the local terminal 40 may perform the same processing as the information processing device 130 of the management server 100. In summary, it is sufficient that the mobility service system 1 includes an information processing device that performs the same processing as the information processing device 130 of the management server 100. The information processing device may be distributed to a plurality of devices.

What is claimed is:

1. A mobility service system that delivers a mobility service utilizing an electric vertical takeoff and landing aircraft (hereinafter referred to as an eVTOL), the mobility service system comprising one or more processors configured to execute a reservation process that plans an itinerary including movement from a first takeoff and landing site to a second takeoff and landing site in response to a reservation request from a user, wherein in the reservation process, the one or more processors are further configured to:

identify a first eVTOL that is available at the first takeoff and landing site;

estimate, by an information processing device, a first amount of battery charge of the first eVTOL at a time of start of use by the user;

determine, by the information processing device, whether or not a first flight from the first takeoff and landing site to the second takeoff and landing site is achievable with the first amount of battery charge;

when the first flight is achievable with the first amount of battery charge, plan a first itinerary including the first flight, and instruct the first eVTOL to operate according to the first itinerary to fly from the first takeoff and landing site to the second takeoff and landing site; and when the first flight is not achievable with the first amount of battery charge, search for a second flight from the first takeoff and landing site to a third takeoff and landing site that is achievable with the first amount of battery charge, and plan a second itinerary that goes through the third takeoff and landing site, and instruct the first eVTOL to operate according to the second itinerary to fly from the first takeoff and landing site to the third takeoff and landing site, wherein the second itinerary includes a combination of the second flight from the first takeoff and landing site to the third takeoff and landing site by the first eVTOL and movement from the third takeoff and landing site to the second takeoff and landing site by a transportation different from the first eVTOL.

2. The mobility service system according to claim 1, wherein the one or more processors determine that the first flight is achievable with the first amount of battery charge when the first amount of battery charge is equal to or more than a threshold, and the threshold is equal to or more than a minimum amount of battery charge that is required for the first eVTOL to fly from the first takeoff and landing site to the second takeoff and landing site.

3. The mobility service system according to claim 2, wherein a margin amount of battery charge is an amount of battery charge required for the first eVTOL to fly to an emergency landing point around the second takeoff and landing site if the second takeoff and landing site is not available when landing, and the threshold is equal to or more than a sum of the minimum amount of battery charge and the margin amount of battery charge.

4. The mobility service system according to claim 1, wherein when the first flight is not achievable with the first amount of battery charge, the one or more processors are further configured to plan a third itinerary in addition to the second itinerary, and the third itinerary includes charging the first eVTOL until the first flight becomes achievable and then performing the first flight from the first takeoff and landing site to the second takeoff and landing site by the first eVTOL.

5. The mobility service system according to claim 4, wherein the one or more processors are further configured to compare a required time of the second itinerary and a required time of the third itinerary and to present the user with one having a shorter required time out of the second itinerary and the third itinerary.

6. The mobility service system according to claim 4, wherein the one or more processors are further configured to present the user with both the second itinerary and the third itinerary.

7. The mobility service system according to claim 1, wherein the third takeoff and landing site is a transit point located between the first takeoff and landing site and the second takeoff and landing site.

8. The mobility service system according to claim 1, wherein the one or more processors are further configured to estimate, by the information processing device, the first amount of battery charge of the first eVTOL at the time of start of use by the user, based on the reservation request from the user, a schedule of the first eVTOL, and a charging ability of a battery charging facility of the first takeoff and landing site.

9. The mobility service system according to claim 1, wherein in response to planning the first itinerary, the one or more processors transmit information on the first itinerary over wireless communication to a user terminal to display the first itinerary on the user terminal, and in response to planning the second itinerary, the one or more processors transmit information on the second itinerary over wireless communication to the user terminal to display the second itinerary on the user terminal.

10. A mobility service delivery method that delivers a mobility service utilizing an electric vertical takeoff and landing aircraft (hereinafter referred to as an eVTOL), wherein the mobility service delivery method is performed by a computer executing a computer program, the mobility service delivery method comprising a reservation process that plans an itinerary including movement from a first takeoff and landing site to a second takeoff and landing site in response to a reservation request from a user, wherein the reservation process includes:

identifying a first eVTOL that is available at the first takeoff and landing site;

estimating, by an information processing device, a first amount of battery charge of the first eVTOL at a time of start of use by the user;

determining, by the information processing device, whether or not a first flight from the first takeoff and landing site to the second takeoff and landing site is achievable with the first amount of battery charge;

when the first flight is achievable with the first amount of battery charge, planning a first itinerary including the first flight, and instruct the first eVTOL to operate according to the first itinerary to fly from the first takeoff and landing site to the second takeoff and landing site; and when the first flight is not achievable with the first amount of battery charge, searching for a second flight from the first takeoff and landing site to a third takeoff and landing site that is achievable with the first amount of battery charge, and planning a second itinerary that goes through the third takeoff and landing site, and instruct the first eVTOL to operate according to the second itinerary to fly from the first takeoff and landing site to the third takeoff and landing site, and wherein the second itinerary includes a combination of the second flight from the first takeoff and landing site to the third takeoff and landing site by the first eVTOL and movement from the third takeoff and landing site to the second takeoff and landing site by a transportation different from the first eVTOL.

* * * * *